United States Patent
Kotler et al.

(10) Patent No.: US 7,506,242 B2
(45) Date of Patent: Mar. 17, 2009

(54) SYSTEM AND METHOD FOR INTEGRATING SPREADSHEETS AND WORD PROCESSING TABLES

(75) Inventors: Matthew J. Kotler, Kenmore, WA (US); Alexander G. Gounares, Kirkland, WA (US); Oliver G. Fisher, Ottawa (CA); Richard J. Wolf, Seattle, WA (US); Vinod Anantharaman, Issaquah, WA (US); Matthew D. Morgan, Seattle, WA (US); Christopher Matthew Franklin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 10/961,283

(22) Filed: Oct. 8, 2004

(65) Prior Publication Data

US 2005/0050088 A1   Mar. 3, 2005

Related U.S. Application Data

(62) Division of application No. 09/599,809, filed on Jun. 21, 2000.

(51) Int. Cl.
 G06F 15/00 (2006.01)
 G06F 17/00 (2006.01)
(52) U.S. Cl. .................. 715/209; 715/213; 715/234; 715/227; 715/219; 715/220
(58) Field of Classification Search .................. 715/503, 715/504, 513
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |

(Continued)

FOREIGN PATENT DOCUMENTS

EP   0841615   11/1999

(Continued)

OTHER PUBLICATIONS

Dave Raggett, "HTML Tables", W3C Internet Draft, Jul. 7, 1995, pp. 1-12.*

(Continued)

*Primary Examiner*—Doug Hutton
*Assistant Examiner*—Nathan Hillery

(57) ABSTRACT

An architecture integrates spreadsheet functionality into tables commonly used in word processing programs and HTML documents. The architecture presents a table user interface (UI) that resembles a table when not being edited and adds spreadsheet elements to the table when being edited. Underlying the table UI, the architecture separates data handling functions from presentation functions. The architecture includes a table appearance manager to manage how the table appears in a document including such characteristics as table resizing, selection, cut, copy, paste, split, merge, table formatting and so on. The architecture also has a spreadsheet functionality manager to manage the spreadsheet functions for the table, such as recalculation, formula handling, sorting, referencing, and the like. The bifurcated architecture supports cross-table referencing, reference editing, automatic universal recalculation throughout all tables in the document, and nested table structures in which one table is nested within a cell of another table.

24 Claims, 10 Drawing Sheets

U.S. PATENT DOCUMENTS

| | | |
|---|---|---|
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A * | 5/1997 | Redpath ................. 707/103 R |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |

| | | | | | | |
|---|---|---|---|---|---|---|
| 6,018,743 A | 1/2000 | Xu | | 6,345,361 B1 | 2/2002 | Jerger et al. |
| 6,026,379 A | 2/2000 | Haller et al. | | 6,347,323 B1 | 2/2002 | Garber et al. |
| 6,026,416 A | 2/2000 | Kanerva et al. | | 6,349,408 B1 | 2/2002 | Smith |
| 6,031,989 A | 2/2000 | Cordell | | 6,351,574 B1 | 2/2002 | Yair et al. |
| 6,035,297 A | 3/2000 | Van Huben et al. | | 6,353,851 B1 | 3/2002 | Anupam et al. |
| 6,035,309 A | 3/2000 | Dauerer et al. | | 6,353,926 B1 | 3/2002 | Parthesarathy et al. |
| 6,044,205 A | 3/2000 | Reed et al. | | 6,356,906 B1 | 3/2002 | Lippert et al. |
| 6,052,531 A | 4/2000 | Waldin et al. | | 6,357,038 B1 | 3/2002 | Scouten |
| 6,052,710 A | 4/2000 | Saliba et al. | | 6,366,907 B1 | 4/2002 | Fanning et al. |
| 6,054,987 A | 4/2000 | Richardson | | 6,366,912 B1 | 4/2002 | Wallent et al. |
| 6,072,870 A | 6/2000 | Nguyen et al. | | 6,367,013 B1 | 4/2002 | Bisbee et al. |
| 6,078,326 A | 6/2000 | Kilmer et al. | | 6,369,840 B1 | 4/2002 | Barnett et al. |
| 6,078,327 A | 6/2000 | Liman et al. | | 6,369,841 B1 | 4/2002 | Salomon et al. |
| 6,078,924 A | 6/2000 | Ainsbury et al. | | 6,374,402 B1 | 4/2002 | Schmeidler et al. |
| 6,081,610 A | 6/2000 | Dwork et al. | | 6,381,742 B2 | 4/2002 | Forbes et al. |
| 6,084,585 A | 7/2000 | Kraft et al. | | 6,381,743 B1 | 4/2002 | Mutschler, III |
| 6,088,708 A | 7/2000 | Burch et al. | | 6,389,434 B1 | 5/2002 | Rivette |
| 6,091,417 A | 7/2000 | Lefkowitz | | 6,393,456 B1 | 5/2002 | Ambler et al. |
| 6,094,657 A | 7/2000 | Hailpern et al. | | 6,396,488 B1 | 5/2002 | Simmons et al. |
| 6,097,382 A | 8/2000 | Rosen et al. | | 6,405,221 B1 | 6/2002 | Levine et al. |
| 6,098,081 A | 8/2000 | Heidorn et al. | | 6,408,311 B1 | 6/2002 | Baisley et al. |
| 6,108,637 A | 8/2000 | Blumenau | | 6,414,700 B1 | 7/2002 | Kurtenbach et al. |
| 6,108,783 A | 8/2000 | Krawczyk et al. | | 6,421,070 B1 | 7/2002 | Ramos et al. |
| 6,115,646 A | 9/2000 | Fiszman et al. | | 6,421,656 B1 | 7/2002 | Cheng et al. |
| 6,121,965 A | 9/2000 | Kenney et al. | | 6,425,125 B1 | 7/2002 | Fries et al. |
| 6,122,647 A | 9/2000 | Horowitz | | 6,429,885 B1 | 8/2002 | Saib et al. |
| 6,144,969 A | 11/2000 | Inokuchi et al. | | 6,434,563 B1 | 8/2002 | Pasquali et al. |
| 6,151,624 A | 11/2000 | Teare et al. | | 6,434,564 B2 | 8/2002 | Ebert |
| 6,154,128 A | 11/2000 | Wookey et al. | | 6,442,563 B1 | 8/2002 | Bacon et al. |
| 6,163,772 A | 12/2000 | Kramer et al. | | 6,442,755 B1 | 8/2002 | Lemmons et al. |
| 6,167,521 A | 12/2000 | Smith et al. | | 6,446,110 B1 | 9/2002 | Lection et al. |
| 6,167,523 A | 12/2000 | Strong | | 6,449,617 B1 | 9/2002 | Quinn et al. |
| 6,182,094 B1 | 1/2001 | Humpleman et al. | | 6,457,009 B1 | 9/2002 | Bollay |
| 6,182,095 B1 | 1/2001 | Leymaster et al. | | 6,460,058 B2 | 10/2002 | Koppulu |
| 6,188,401 B1 | 2/2001 | Peyer | | 6,463,419 B1 | 10/2002 | Kluss |
| 6,191,797 B1 | 2/2001 | Politis | | 6,470,349 B1 | 10/2002 | Heninger et al. |
| 6,192,367 B1 | 2/2001 | Hawley et al. | | 6,473,800 B1 | 10/2002 | Jerger et al. |
| 6,195,661 B1 | 2/2001 | Filepp et al. | | 6,476,828 B1 | 11/2002 | Burkett et al. |
| 6,199,204 B1 | 3/2001 | Donohue | | 6,476,833 B1 | 11/2002 | Moshfeghi |
| 6,209,128 B1 | 3/2001 | Gerard et al. | | 6,477,544 B1 | 11/2002 | Bolosky |
| 6,216,152 B1 | 4/2001 | Wong et al. | | 6,480,860 B1 | 11/2002 | Monday |
| 6,219,698 B1 | 4/2001 | Iannucci et al. | | 6,487,566 B1 | 11/2002 | Sundaresan |
| 6,225,996 B1 | 5/2001 | Gibb et al. | | 6,490,601 B1 | 12/2002 | Markus et al. |
| 6,235,027 B1 | 5/2001 | Herzon | | 6,493,702 B1 | 12/2002 | Adar et al. |
| 6,253,366 B1 | 6/2001 | Mutschler, III | | 6,501,864 B1 | 12/2002 | Eguchi et al. |
| 6,253,374 B1 | 6/2001 | Dresevic et al. | | 6,502,101 B1 | 12/2002 | Verprauskus et al. |
| 6,263,313 B1 | 7/2001 | Milsted et al. | | 6,502,103 B1 | 12/2002 | Frey et al. |
| 6,266,810 B1 | 7/2001 | Tanaka et al. | | 6,505,230 B1 | 1/2003 | Mohan et al. |
| 6,268,852 B1 | 7/2001 | Lindhorst et al. | | 6,505,300 B2 | 1/2003 | Chan et al. |
| 6,272,506 B1 | 8/2001 | Bell | | 6,507,856 B1 | 1/2003 | Chen et al. |
| 6,275,227 B1 | 8/2001 | DeStefano | | 6,516,322 B1 | 2/2003 | Meredith |
| 6,275,599 B1 | 8/2001 | Adler et al. | | 6,519,617 B1 | 2/2003 | Wanderski et al. |
| 6,279,042 B1 | 8/2001 | Ouchi | | RE38,070 E | 4/2003 | Spies et al. |
| 6,281,896 B1 | 8/2001 | Alimpich et al. | | 6,546,546 B1 | 4/2003 | Van Doorn |
| 6,282,711 B1 | 8/2001 | Halpern et al. | | 6,549,221 B1 | 4/2003 | Brown et al. |
| 6,286,033 B1 | 9/2001 | Kishinsky et al. | | 6,549,878 B1 | 4/2003 | Lowry et al. |
| 6,292,897 B1 | 9/2001 | Gennaro et al. | | 6,549,922 B1 | 4/2003 | Srivastava et al. |
| 6,297,819 B1 | 10/2001 | Furst | | 6,553,402 B1 | 4/2003 | Makarios et al. |
| 6,300,948 B1 | 10/2001 | Geller et al. | | 6,560,616 B1 | 5/2003 | Garber |
| 6,307,955 B1 | 10/2001 | Zank et al. | | 6,560,620 B1 | 5/2003 | Ching |
| 6,308,179 B1 | 10/2001 | Petersen et al. | | 6,560,640 B2 | 5/2003 | Smethers |
| 6,308,273 B1 | 10/2001 | Goertzel et al. | | 6,563,514 B1 | 5/2003 | Samar |
| 6,311,271 B1 | 10/2001 | Gennaro et al. | | 6,571,253 B1 | 5/2003 | Thompson et al. |
| 6,314,415 B1 | 11/2001 | Mukherjee | | 6,578,144 B1 | 6/2003 | Gennaro et al. |
| 6,321,259 B1 | 11/2001 | Ouellette et al. | | 6,581,061 B1 | 6/2003 | Graham |
| 6,321,334 B1 | 11/2001 | Jerger et al. | | 6,584,469 B1 | 6/2003 | Chiang et al. |
| 6,327,628 B1 | 12/2001 | Anuff et al. | | 6,584,548 B1 | 6/2003 | Bourne et al. |
| 6,331,864 B1 | 12/2001 | Coco et al. | | 6,585,778 B1 | 7/2003 | Hind et al. |
| 6,342,907 B1 | 1/2002 | Petty et al. | | 6,589,290 B1 | 7/2003 | Maxwell et al. |
| 6,343,149 B1 | 1/2002 | Motoiwa | | 6,594,686 B1 | 7/2003 | Edwards et al. |
| 6,343,302 B1 | 1/2002 | Graham | | 6,598,219 B1 | 7/2003 | Lau |
| 6,345,256 B1 | 2/2002 | Milsted et al. | | 6,603,489 B1 | 8/2003 | Edlund et al. |
| 6,345,278 B1 | 2/2002 | Hitchcock et al. | | 6,604,099 B1 | 8/2003 | Chung et al. |

| | | | | | | |
|---|---|---|---|---|---|---|
| 6,606,606 B2 | 8/2003 | Starr | | 6,950,980 B1 | 9/2005 | Malcolm |
| 6,609,200 B2 | 8/2003 | Anderson et al. | | 6,961,897 B1 | 11/2005 | Peel, Jr. et al. |
| 6,611,822 B1 | 8/2003 | Beams et al. | | 6,963,875 B2 | 11/2005 | Moore et al. |
| 6,611,840 B1 | 8/2003 | Baer et al. | | 6,968,503 B1 | 11/2005 | Chang et al. |
| 6,611,843 B1 | 8/2003 | Jacobs | | 6,968,505 B2 | 11/2005 | Stoll et al. |
| 6,613,098 B1 | 9/2003 | Sorge et al. | | 6,993,714 B2 | 1/2006 | Kaler et al. |
| 6,615,276 B1 | 9/2003 | Mastrianni et al. | | 6,996,776 B1 | 2/2006 | Makely et al. |
| 6,629,109 B1 | 9/2003 | Koshisaka | | 6,996,781 B1 | 2/2006 | Myers et al. |
| 6,631,357 B1 | 10/2003 | Perkowski | | 7,000,179 B2 | 2/2006 | Yankovich et al. |
| 6,631,379 B2 | 10/2003 | Cox | | 7,002,560 B2 | 2/2006 | Graham |
| 6,631,497 B1 | 10/2003 | Jamshidi et al. | | 7,003,722 B2 | 2/2006 | Rothchiller et al. |
| 6,631,519 B1 | 10/2003 | Nicholson et al. | | 7,010,580 B1 | 3/2006 | Fu et al. |
| 6,632,251 B1 | 10/2003 | Rutten et al. | | 7,020,869 B2 | 3/2006 | Abriari et al. |
| 6,635,089 B1 | 10/2003 | Burkett et al. | | 7,024,417 B1 | 4/2006 | Russakovsky et al. |
| 6,636,845 B2 | 10/2003 | Chau et al. | | 7,032,170 B2 | 4/2006 | Poulose |
| 6,643,633 B2 | 11/2003 | Chau et al. | | 7,036,072 B1 | 4/2006 | Sulistio et al. |
| 6,643,652 B2 | 11/2003 | Helgeson et al. | | 7,039,875 B2 | 5/2006 | Khalfay et al. |
| 6,643,684 B1 | 11/2003 | Malkin et al. | | 7,051,273 B1 | 5/2006 | Holt et al. |
| 6,651,217 B1 | 11/2003 | Kennedy et al. | | 7,058,663 B2 | 6/2006 | Johnston et al. |
| 6,654,737 B1 | 11/2003 | Nunez | | 7,062,764 B2 | 6/2006 | Cohen et al. |
| 6,654,932 B1 | 11/2003 | Bahrs et al. | | 7,065,493 B1 | 6/2006 | Homsi |
| 6,658,417 B1 | 12/2003 | Stakutis et al. | | 7,080,083 B2 | 7/2006 | Kim et al. |
| 6,658,622 B1 | 12/2003 | Aiken et al. | | 7,080,325 B2 | 7/2006 | Treibach-Heck et al. |
| 6,661,920 B1 | 12/2003 | Skinner | | 7,086,009 B2 | 8/2006 | Resnick et al. |
| 6,668,369 B1 | 12/2003 | Krebs et al. | | 7,086,042 B2 | 8/2006 | Abe et al. |
| 6,671,805 B1 | 12/2003 | Brown et al. | | 7,088,374 B2 | 8/2006 | David et al. |
| 6,675,202 B1 | 1/2004 | Perttunen | | 7,100,147 B2 | 8/2006 | Miller et al. |
| 6,678,717 B1 | 1/2004 | Schneider | | 7,103,611 B2 | 9/2006 | Murthy et al. |
| 6,681,370 B2 | 1/2004 | Gounares et al. | | 7,106,888 B1 | 9/2006 | Silverbrook et al. |
| 6,691,230 B1 | 2/2004 | Bardon | | 7,107,282 B1 | 9/2006 | Yalamanchi |
| 6,691,281 B1 | 2/2004 | Sorge et al. | | 7,107,521 B2 | 9/2006 | Santos |
| 6,697,944 B1 | 2/2004 | Jones et al. | | 7,146,564 B2 | 12/2006 | Kim et al. |
| 6,701,434 B1 | 3/2004 | Rohatgi | | 7,152,205 B2 | 12/2006 | Day et al. |
| 6,701,486 B1 | 3/2004 | Weber et al. | | 7,168,035 B1 | 1/2007 | Bell et al. |
| 6,704,906 B1 | 3/2004 | Yankovich et al. | | 7,178,166 B1 | 2/2007 | Taylor et al. |
| 6,711,679 B1 | 3/2004 | Guski et al. | | 7,190,376 B1 | 3/2007 | Tonisson |
| 6,720,985 B1 | 4/2004 | Silverbrook et al. | | 7,191,394 B1 | 3/2007 | Ardeleanu et al. |
| 6,725,426 B1 | 4/2004 | Pavlov | | 7,213,200 B2 | 5/2007 | Abe et al. |
| 6,728,755 B1 | 4/2004 | de Ment | | 7,236,982 B2 | 6/2007 | Zlatanov et al. |
| 6,735,721 B1 | 5/2004 | Morrow et al. | | 7,281,018 B1 | 10/2007 | Begun et al. |
| 6,745,367 B1 | 6/2004 | Bates et al. | | 7,296,017 B2 | 11/2007 | Larcheveque et al. |
| 6,748,385 B1 | 6/2004 | Rodkin | | 7,313,758 B2 | 12/2007 | Kozlov |
| 6,751,777 B2 | 6/2004 | Bates | | 7,316,003 B1 | 1/2008 | Dulepet et al. |
| 6,754,874 B1 | 6/2004 | Richman | | 7,318,237 B1 | 1/2008 | Moriconi et al. |
| 6,757,826 B1 | 6/2004 | Paltenghe | | 7,346,610 B2 | 3/2008 | Ruthfield et al. |
| 6,757,868 B1 | 6/2004 | Glaser et al. | | 7,350,141 B2 | 3/2008 | Kotler et al. |
| 6,760,723 B2 | 7/2004 | Oshinsky et al. | | 2001/0007109 A1 | 7/2001 | Lange |
| 6,763,343 B1 | 7/2004 | Brooke et al. | | 2001/0022592 A1 | 9/2001 | Alimpich et al. |
| 6,772,139 B1 | 8/2004 | Smith, III | | 2001/0024195 A1 | 9/2001 | Hayakawa |
| 6,772,165 B2 | 8/2004 | O'Carroll | | 2001/0037345 A1 | 11/2001 | Kiernan et al. |
| 6,774,926 B1 | 8/2004 | Ellis et al. | | 2001/0054004 A1 | 12/2001 | Powers |
| 6,779,154 B1 | 8/2004 | Nussbaum et al. | | 2001/0056429 A1 | 12/2001 | Moore et al. |
| 6,781,609 B1 | 8/2004 | Barker et al. | | 2001/0056460 A1 | 12/2001 | Sahota et al. |
| 6,782,144 B2 | 8/2004 | Bellavita et al. | | 2002/0010700 A1 | 1/2002 | Wotring |
| 6,799,299 B1 | 9/2004 | Li et al. | | 2002/0010743 A1 | 1/2002 | Ryan et al. |
| 6,801,929 B1 | 10/2004 | Donoho et al. | | 2002/0010746 A1 | 1/2002 | Jilk, Jr. et al. |
| 6,816,849 B1 | 11/2004 | Halt, Jr. | | 2002/0013788 A1 | 1/2002 | Pennell et al. |
| 6,845,380 B2 | 1/2005 | Su et al. | | 2002/0019941 A1 | 2/2002 | Chan et al. |
| 6,845,499 B2 | 1/2005 | Srivastava et al. | | 2002/0023113 A1 | 2/2002 | Hsing et al. |
| 6,847,387 B2 | 1/2005 | Roth | | 2002/0026441 A1 | 2/2002 | Kutay et al. |
| 6,848,078 B1 | 1/2005 | Birsan et al. | | 2002/0026461 A1 | 2/2002 | Kutay et al. |
| 6,871,220 B1 | 3/2005 | Rajan et al. | | 2002/0032590 A1 | 3/2002 | Anand et al. |
| 6,874,130 B1 | 3/2005 | Baweja et al. | | 2002/0032692 A1 | 3/2002 | Suzuki et al. |
| 6,889,359 B1 * | 5/2005 | Conner et al. ............... 715/509 | | 2002/0032706 A1 | 3/2002 | Perla et al. |
| 6,901,403 B1 | 5/2005 | Bata et al. | | 2002/0032768 A1 | 3/2002 | Voskuil |
| 6,915,454 B1 | 7/2005 | Moore et al. | | 2002/0035579 A1 | 3/2002 | Wang et al. |
| 6,931,532 B1 | 8/2005 | Davis et al. | | 2002/0035581 A1 | 3/2002 | Reynar et al. |
| 6,941,510 B1 | 9/2005 | Ozzie et al. | | 2002/0040469 A1 | 4/2002 | Pramberger |
| 6,941,511 B1 | 9/2005 | Hind et al. | | 2002/0054126 A1 | 5/2002 | Gamon |
| 6,941,521 B2 | 9/2005 | Lin et al. | | 2002/0054128 A1 | 5/2002 | Lau et al. |
| 6,948,129 B1 | 9/2005 | Loghmani | | 2002/0057297 A1 | 5/2002 | Grimes et al. |
| 6,948,133 B2 | 9/2005 | Haley | | 2002/0065798 A1 | 5/2002 | Bostleman et al. |
| 6,948,135 B1 | 9/2005 | Ruthfield et al. | | 2002/0065847 A1 | 5/2002 | Furukawa et al. |

| | | | | | |
|---|---|---|---|---|---|
| 2002/0070973 A1 | 6/2002 | Croley | 2003/0205615 A1 | 11/2003 | Marappan |
| 2002/0078074 A1 | 6/2002 | Cho et al. | 2003/0212664 A1 | 11/2003 | Breining et al. |
| 2002/0078103 A1 | 6/2002 | Gorman et al. | 2003/0212902 A1 | 11/2003 | van der Made |
| 2002/0083318 A1 | 6/2002 | Larose | 2003/0217053 A1 | 11/2003 | Bachman et al. |
| 2002/0099952 A1 | 7/2002 | Lambert et al. | 2003/0220930 A1 | 11/2003 | Milleker et al. |
| 2002/0100027 A1 | 7/2002 | Binding et al. | 2003/0225469 A1 | 12/2003 | DeRemer et al. |
| 2002/0112224 A1 | 8/2002 | Cox | 2003/0225768 A1 | 12/2003 | Chaudhuri |
| 2002/0129056 A1 | 9/2002 | Conant | 2003/0225829 A1 | 12/2003 | Pena et al. |
| 2002/0133484 A1 | 9/2002 | Chau et al. | 2003/0226111 A1 | 12/2003 | Wirts et al. |
| 2002/0152222 A1 | 10/2002 | Holbrook | 2003/0226132 A1 | 12/2003 | Tondreau et al. |
| 2002/0152244 A1 | 10/2002 | Dean et al. | 2003/0233374 A1 | 12/2003 | Spinola et al. |
| 2002/0156772 A1 | 10/2002 | Chau et al. | 2003/0233644 A1 | 12/2003 | Cohen et al. |
| 2002/0156846 A1 | 10/2002 | Rawat et al. | 2003/0236859 A1 | 12/2003 | Vaschillo et al. |
| 2002/0156929 A1 | 10/2002 | Hekmatpour | 2003/0236903 A1 | 12/2003 | Piotrowski |
| 2002/0169752 A1 | 11/2002 | Kusama et al. | 2003/0237046 A1 | 12/2003 | Parker et al. |
| 2002/0169789 A1 | 11/2002 | Kutay et al. | 2003/0237047 A1 | 12/2003 | Borson |
| 2002/0174147 A1 | 11/2002 | Wang et al. | 2004/0002939 A1 | 1/2004 | Arora |
| 2002/0174417 A1 | 11/2002 | Sijacic et al. | 2004/0003031 A1 | 1/2004 | Brown et al. |
| 2002/0178380 A1 | 11/2002 | Wolf et al. | 2004/0003353 A1 | 1/2004 | Rivera et al. |
| 2002/0184219 A1 | 12/2002 | Preisig et al. | 2004/0003389 A1 | 1/2004 | Reynar et al. |
| 2002/0188597 A1 | 12/2002 | Kern et al. | 2004/0010752 A1 | 1/2004 | Chan et al. |
| 2002/0188613 A1 | 12/2002 | Chakraborty et al. | 2004/0024842 A1 | 2/2004 | Witt |
| 2002/0194219 A1 | 12/2002 | Bradley et al. | 2004/0030991 A1 | 2/2004 | Hepworth et al. |
| 2002/0196281 A1 | 12/2002 | Audleman et al. | 2004/0039990 A1 | 2/2004 | Bakar et al. |
| 2002/0196288 A1 | 12/2002 | Emrani | 2004/0039993 A1 | 2/2004 | Kougiouris et al. |
| 2002/0198891 A1 | 12/2002 | Li et al. | 2004/0044961 A1 | 3/2004 | Pesenson |
| 2002/0198935 A1 | 12/2002 | Crandall, Sr. et al. | 2004/0044965 A1 | 3/2004 | Toyama et al. |
| 2003/0004951 A1 | 1/2003 | Chokshi | 2004/0054966 A1 | 3/2004 | Busch et al. |
| 2003/0007000 A1 | 1/2003 | Carlson et al. | 2004/0059754 A1 | 3/2004 | Barghout et al. |
| 2003/0014397 A1 | 1/2003 | Chau et al. | 2004/0073565 A1 | 4/2004 | Kaufman et al. |
| 2003/0018668 A1 | 1/2003 | Britton et al. | 2004/0073868 A1 | 4/2004 | Easter et al. |
| 2003/0020746 A1 | 1/2003 | Chen et al. | 2004/0078756 A1 | 4/2004 | Napper et al. |
| 2003/0023641 A1 | 1/2003 | Gorman et al. | 2004/0083426 A1 | 4/2004 | Sahu |
| 2003/0025732 A1 | 2/2003 | Prichard | 2004/0088647 A1 | 5/2004 | Miller et al. |
| 2003/0026507 A1 | 2/2003 | Zlotnick | 2004/0088652 A1 | 5/2004 | Abe et al. |
| 2003/0028550 A1 | 2/2003 | Lee et al. | 2004/0093596 A1 | 5/2004 | Koyano |
| 2003/0033037 A1 | 2/2003 | Yuen et al. | 2004/0107367 A1 | 6/2004 | Kisters |
| 2003/0037303 A1 | 2/2003 | Bodlaender | 2004/0117769 A1 | 6/2004 | Lauzon et al. |
| 2003/0043986 A1 | 3/2003 | Creamer | 2004/0123277 A1 | 6/2004 | Schrader et al. |
| 2003/0046665 A1 | 3/2003 | Ilin | 2004/0146199 A1 | 7/2004 | Berkner et al. |
| 2003/0048301 A1 | 3/2003 | Menninger | 2004/0163041 A1 | 8/2004 | Engel |
| 2003/0051243 A1 | 3/2003 | Lemmons et al. | 2004/0172442 A1 | 9/2004 | Ripley |
| 2003/0055811 A1 | 3/2003 | Stork et al. | 2004/0181711 A1 | 9/2004 | Johnson et al. |
| 2003/0055828 A1 | 3/2003 | Koch et al. | 2004/0186762 A1 | 9/2004 | Beaven et al. |
| 2003/0056198 A1 | 3/2003 | Al-Azzawe | 2004/0189716 A1 | 9/2004 | Paoli et al. |
| 2003/0061386 A1 | 3/2003 | Brown | 2004/0194035 A1 | 9/2004 | Chakraborty |
| 2003/0061567 A1 | 3/2003 | Brown et al. | 2004/0205473 A1 | 10/2004 | Fisher et al. |
| 2003/0074279 A1 | 4/2003 | Viswanath et al. | 2004/0205525 A1 | 10/2004 | Murren et al. |
| 2003/0084424 A1 | 5/2003 | Reddy et al. | 2004/0205534 A1 | 10/2004 | Koelle |
| 2003/0093755 A1 | 5/2003 | O'Carroll | 2004/0205571 A1 | 10/2004 | Adler et al. |
| 2003/0110443 A1 | 6/2003 | Yankovich et al. | 2004/0205592 A1 | 10/2004 | Huang |
| 2003/0120578 A1 | 6/2003 | Newman | 2004/0205605 A1 | 10/2004 | Adler et al. |
| 2003/0120651 A1 | 6/2003 | Bernstein et al. | 2004/0205653 A1 | 10/2004 | Hadfield et al. |
| 2003/0120659 A1 | 6/2003 | Sridhar | 2004/0205671 A1 | 10/2004 | Sukehiro et al. |
| 2003/0120671 A1 | 6/2003 | Kim et al. | 2004/0210599 A1 | 10/2004 | Friedman et al. |
| 2003/0120686 A1 | 6/2003 | Kim et al. | 2004/0221238 A1 | 11/2004 | Cifra et al. |
| 2003/0126555 A1 | 7/2003 | Aggarwal et al. | 2004/0221245 A1 | 11/2004 | Chickles et al. |
| 2003/0128196 A1 | 7/2003 | Lapstun et al. | 2004/0237030 A1 | 11/2004 | Malkin |
| 2003/0135825 A1 | 7/2003 | Gertner et al. | 2004/0261019 A1 | 12/2004 | Imamura et al. |
| 2003/0140132 A1 | 7/2003 | Champagne et al. | 2004/0268229 A1 | 12/2004 | Paoli et al. |
| 2003/0158897 A1 | 8/2003 | Ben-Natan et al. | 2005/0004893 A1 | 1/2005 | Sangroniz |
| 2003/0163285 A1 | 8/2003 | Nakamura et al. | 2005/0005248 A1 | 1/2005 | Rockey et al. |
| 2003/0167277 A1 | 9/2003 | Hejlsberg et al. | 2005/0015279 A1 | 1/2005 | Rucker |
| 2003/0182268 A1 | 9/2003 | Lal | 2005/0015732 A1 | 1/2005 | Vedula et al. |
| 2003/0182327 A1 | 9/2003 | Ramanujam et al. | 2005/0022115 A1 | 1/2005 | Baumgartner et al. |
| 2003/0187756 A1 | 10/2003 | Klivington et al. | 2005/0027757 A1 | 2/2005 | Kiessig et al. |
| 2003/0187930 A1 | 10/2003 | Ghaffar et al. | 2005/0033728 A1 | 2/2005 | James |
| 2003/0188260 A1 | 10/2003 | Jensen et al. | 2005/0038711 A1 | 2/2005 | Marlelo |
| 2003/0189593 A1 | 10/2003 | Yarvin | 2005/0055627 A1 | 3/2005 | Lloyd et al. |
| 2003/0192008 A1 | 10/2003 | Lee | 2005/0060324 A1 | 3/2005 | Johnson et al. |
| 2003/0200506 A1 | 10/2003 | Abe et al. | 2005/0060721 A1 | 3/2005 | Choudhary et al. |
| 2003/0204511 A1 | 10/2003 | Brundage | 2005/0065933 A1 | 3/2005 | Goering |
| 2003/0204814 A1 | 10/2003 | Elo et al. | 2005/0065936 A1 | 3/2005 | Goering |

| | | |
|---|---|---|
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0132196 A1 | 6/2005 | Dietl |
| 2005/0138086 A1 | 6/2005 | Pecht-Seibert |
| 2005/0138539 A1 | 6/2005 | Bravery et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0240876 A1 | 10/2005 | Myers et al. |
| 2005/0246304 A1 | 11/2005 | Knight et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0129978 A1 | 6/2006 | Abriani et al. |
| 2006/0143220 A1 | 6/2006 | Spencer, Jr. |
| 2006/0161559 A1 | 7/2006 | Bordawekar et al. |
| 2006/0200754 A1 | 9/2006 | Kablesh et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0028340 A1 | 1/2008 | Davis |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 8/2001 |

OTHER PUBLICATIONS

Microsoft Word 2000; Screenshots; 1999; pp. 1-5.*
Word, Microsoft word 2000 screenshots, 2000, Microsoft pp. 1-7.*
Halberg et al.; "Using Microsoft Excel 97"; Published 1997, Bestseller Edition. 40 pages.
Acklen et al.; Using Corel WordPerfect 9, 251-284, 424-434, 583-586, (1998).
Acklen et al., Using Corel WordPerfect 9, 251-284, 424-434, 583-586, (1998).
Bruce Halberg et al, "Using Microsoft Excel 97", Published 1997, Bestseller Edition, Pertinent pp. 1-9, 18-25, 85-89, 98,101, 106-113, 124-127, 144-147, 190-201, 209-210, 218-227, 581-590, 632-633, 650-655, 712-714.
LeBlond et al, "PC Magazine Guide to Quattro Pro for Windows", pp. 9-11, 42-61, Ziff-Davis Press, Copyright 1993 by the LeBlond Group.
Bruce Hollberg et al. "Using Microsoft Exel 97" (Public Release 1997, By Que Corporation) pp. 581-590, 85-89, 209-210, 190-201, 712-714.
"A Tour of Xmetal" O'Reilly XML.COM 'Online Jul. 14, 1999 XP002230081 retrieved from the Internet: <URL:http://www.xml.com/pub/a/SeyboldReport/ip0311025.html> retrieved on Feb. 5, 2003.
"Architecture for a Dynamic Information Area Control" IBM Technical Disclosure Bulletin IBM Corp. New York US vol. 37 No. 10 Jan. 10, 1994. pp. 245-246.
"Netscape Communicator's Collapsible Toolbars" CHI'98 Human Factors in Computing Systems Conference Proceedings Los Angeles CA Apr. 18-23, 1998 pp. 81-86.
Barker et al., "Creating In-Line Objects Within An Integrated Editing Environment," IBM Technical Disclosure Bulletin, vol. 27, No. 5, Oct. 1984, p. 2962.
"Flexible Information Presentation with XML" 1998 The Institution of Electrical Engineers 6 pages.
Berg A., "Naming and Binding: Monikers" Inside OLE, 1995, Chapter 9, pp. 431-480.
"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
"XKvalidator: A Constraint Validator XML" CIKM '-2 Nov. 4-9, 2002 Copyright 2002 ACM 1-58113-492-4/02/0011 pp. 446-452.
"Designing Valid XML Views" ER 2002 LNCS 2503 2002 Springer-Verlag Berlin Heidelberg 2002 pp. 463-477.
Efficient Management of Multiversion Documents by Object Referencing Proceedings of the 27th VLDB Conference 2001 pp. 291-300.
"Efficient schemes for managing multiversion XML documents" VLDB Journal (2002) pp. 332-352.
"Storing and Querying Multiversion XML Documents using Durable Node Numbers" IEEE 2002 pp. 232-241.
"XML Document Versioning" SIGMOD Record vol. 30 No. 3 Sep. 2001 pp. 46-53.
"Generic Validation of Structural Content with Parametric Modules" ICFP '01 Sep. 3-5, 2001 Copyright 2001 ACM 1-58113-415-0/01/0009 pp. 98-109.
"Managing Complex Documents Over the WWW: A Case Study for XML" IEEE Transactions on Knowledge and Data Engineering vol. 11 No. 4 Jul./Aug. 1999, pp. 629-938.
Clapp D., "The NeXT Application Kit Part I: Non-Responsive Classes," The NeXT Bible 1990, Chapter 16, pp. 275-293.
Clark James—W3C Editor; "XSL Transformation (XSLT) Version 1.0" Nov. 16, 1999 W3C (MIT INRIA Kejo) pp. 1-156.
W3C Editor James Clark and Ste; "XML Path Language (XPath) Version 1.0" Nov. 16, 1999 W3C (MIT INRIA Kejo) pp. 1-49.
"From small beginnings" Knowledge Management Nov. 2001 pp. 28-30.
"XML Editors: Allegations of Functionality in search of reality" Internet 'Online! 1999 XP002230082 retrieved from the Internet <URL:http://www.ivritype.com/xml/22 .

"Photo Shop 5/5.5 WOWI Book" 2000 Peachpit Press pp. 8-17.

Description of Whitehill Composer software product producted by Whitehill Technologies Inc. available at <http://www.xml.com/pub/p/221> accessed on Apr. 8, 2004, two pages.

DiLascia et al., "Sweeper" Microsoft Interactive Developer, vol. 1, No. 1, 1996, 27 pages.

"XML Spy Tops as XML Editor" http://www.eweek.com/article2/0395972404100.asp Nov. 25, 2002 4 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online] Jun. 1999 URL: http://web.archive.org/web/19990912001527/http://www.tildeslash.com/tsbiff/.

Herzner et al., "CDAM- Compound Document Access and Management. An Object-Oriented Approach" Multimedia Systems Interaction and Applications, 1992, Chapter 3, pp. 17-36.

"Micro-Firewalls for Dynamic Network Security with Distributed Intrusion Detection"; IEEE INternational Symposium on Network Computing and Applications; 2001; pp. 68-79.

"Specifiying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heldeberg 2002.

Kobayashi et al., "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73, No. 5, May 1990, pp. 22-33.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—Impact and opportunities" Survey and Statistical Computing 1996. Proceedings of the Second ASC International Conference. Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3. Mar. 2002 pp. 1315.

"Validating MPEG-21 Encapulated Functional Metadata" IEEE 2002 pp. 209-212.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: <URL: http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree front Serialized Tree, Mar. 1, 1994, TDB-ACC-NONN94033, 3 pages.

Bruce Halberg et al, "Using Microsoft Exel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Acklen, et al., Using Corel WordPerfect 9, pp. 251-284, 424-434, 583-586, 1998.

Atova, "User Reference manual Version 4.4, XML Spy suite 4.4," Atova Ges.m.b.H and Altova, Inc., May 24, 2002, pages cover, copyright p. 1-565.

Altova et al. XML Spy, XML Integrated Development Environments, Altova Inc., 2002, pp. 1-18.

Ben-Natan, U.S. Appl. No. 60/203,801, filed May 9, 2000, entitled "Internet platform for creating and supporting communities".

Ixia Soft, "Streamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled ,"Methods and systems for accessing, organizing presenting and viewing data".

Microsoft Word 2000 (see Screen Shot "About Microsoft Word") Published 1983-1999 and Microsoft Exel 2000 (see Screen Shot "About Microsoft Exel") Published 1988-1999, Three pages.

Moore, U.S. Appl. No. 60/191,662, filed Mar. 23, 2000, entitled "Collection-based presistent digital archives".

Altova, Inc., "XML Spy 4.0 Manual," Altova Inc. & Altova GmbH, coyright 1998-2001, Chapters 1, 2, and 6, encompassing pages 1-17, 18-90, and 343-362.

Cybook, INC.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, page 1 (available at http://jwalk.com/ss//excel/tips/tip62.htm).

Macromedia, INC.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

Laura Acklen & Read Gilgen, Using Corel WordPerfect 9, 251-284, 424-434, 583-586 (1998).

Microsoft Visual Basic 5.0 Programmer'S Guide 1997;pp. 578-579;Redmond WA 98052-6399.

Mansfield; Excel 97 for Busy People Published by Osborne/Mcgraw-Hill 1997 pp. 48-50.

Baraband et al., PowerForms: "Declarative Client Site Form Field Validation", World Wide Web, Baltzer Science Publishers, Bussum, NL. vol. 3, No. 4, Dec. 2000, p. 1-20.

"Enter Key", Retrieved on Dec. 20, 2006, at <<http://systems.webopedia.com/TERM/E/Enter_key.html>>, Sep. 1, 1996, pp. 1.

Microsoft Corporation, "Microsoft Computer Dictionary" Microsoft Press, Fifth Edition, p. 149.

Grosso, et al., "XML Fragment Interchange", W3C,(Feb. 2001), 1-28.

Altova, et al., "User and Reference Manual Version 4.4", www.xmlspy.com, (May 24, 2007), 1-565.

"XForm 1.0", W3C,(Jul. 16, 2001).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 By Example", Retrieved from the Internet at http://www.perfectxml.com/Infopath.asp on Jan. 21, 2007,(Apr. 20, 2003).

Raman, T. V., et al., "XForms 1.0", (Dec. 2001),Section 1-12.2.3 & Appendices A-G.

Lehtonen, Micro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko. Micah "XForms and Microsoft InfoPath", Retrieved from the Internet at http://www.xml.com/lpt/a/1311 on Jan. 21, 2007,(Oct. 29, 2003).

Anat, Eyal et al., "Integrating and Customizing Hererogeneous E-Commerce Applications", The VLDB Journal-The International Journal of Very Large Data Bases, vol. 10, Issue 1,(Aug. 2001), 16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osbourne/McGraw-Hill,(2001), 1-2, 359-402.

Halberg, Bruce et al., "Using Microsoft Exel 97", (1997), 191-201, 213-219.

Villard, et al., "An Incremental XSLT Transformation Processor for XML Document Manipulation", http://www2002.org/CDROM/refereed/321, Printed on May 18, 2007,(May 2002),25 pages.

Brabrand, et al., "Power Forms Declarative Client-side Form Field Validation", (2002), 1-20.

"Microsoft Word 2000 Screenshots", (2000), 11-17.

Pacheco, Xavier et al., "Delphi 5 Developer's Guide", Sams Publishing. Chapter 31, Section: Data Streaming,(1999),4.

XmlSpy, "XmlSpy 2004 Enterprise Edition Manual", Altova,(May 17, 2004), 1-25, 220-225.

StylusStudio, "StylusStudio: XPath Tools", 2004-2007, StylusStudio, 1-14.

Dodds, "Toward an XPath API", xml.com,(May 7, 2001), 1-3.

Altova, "Altova Tools for XPath 1.0/2.0", Altova, 1-12.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 pages.

Hu, et al., "A Programmable Editor for Developing Structured Documents based on Bidirectional Transformations", ACM,(Aug. 2004),178-179.

* cited by examiner

John's Construction
1234 N. Road
Anywhere, WA 99999

Dear Mr. Jones,

Here are my preliminary estimates for the work items. Note that I substituted different paint for DuPont since it is out of stock.

| Home Section | Work Items | Cost |
|---|---|---|
| Roof | 1. Rip off shingles<br>2. Resurface and apply stucco | $2,300 |
| Kitchen | 1. Repaint Cabinets<br>2. Rework plumbing for sink<br>3. Add ceramic tiling to floor | $5,500 |
| Family Room | 1. Fix blinds<br>2. Reupholster couch<br>3. Install hardwood floors | $3,500 |
| Porch | 1. Repair structural damage<br>2. Sand and repaint with ivory Asian paint | $760 |

Thanks,

John

Fig. 2

John's Construction
1234 N. Road
Anywhere, WA 99999

Dear Mr. Jones,

Here are my preliminary estimates for the work items. Note that I substituted different paint for DuPont since it is out of stock.

| | A<br>Home Section | B<br>Work Items | C<br>Cost |
|---|---|---|---|
| 1 | Home Section | Work Items | Cost |
| 2 | Roof | 1. Rip off shingles<br>2. Resurface and apply stucco | $2,300 |
| 3 | Kitchen | 1. Repaint Cabinets<br>2. Rework plumbing for sink<br>3. Add ceramic tiling to floor | $5,500 |
| 4 | Family Room | 1. Fix blinds<br>2. Reupholster couch<br>3. Install hardwood floors | $3,500 |
| 5 | Porch | 1. Repair structural damage<br>2. Sand and repaint with ivory Asian paint | $760 |
| 6 | Total | | =SUM( |

Thanks,

John

Fig. 3

John's Construction
1234 N. Road
Anywhere, WA 99999

Dear Mr. Jones,

Here are my preliminary estimates for the work items. Note that I substituted different paint for DuPont since it is out of stock.

|   | A | B | C |
|---|---|---|---|
| 1 | Home Section | Work Items | Cost |
| 2 | Roof | 1. Rip off shingles<br>2. Resurface and apply stucco | $2,300 |
| 3 | Kitchen | Repaint Cabinets — $300<br>Plumb Sink — $1,500<br>Tile Floor — $3,700 | =SUM(Table2!B1:Table2!B3) |
| 4 | Family Room | 1. Fix blinds<br>2. Reupholster couch<br>3. Install hardwood floors | $3,500 |
| 5 | Porch | 1. Repair structural damage<br>2. Sand and repaint with ivory Asian paint | $760 |
| 6 | Total |  | $12,060 |

Thanks,

John

Fig. 5

John's Construction
1234 N. Road
Anywhere, WA 99999

Dear Mr. Jones,

Here are my preliminary estimates for the work items. The total cost is approximately =Table1!B6+Table2!B8 ← 610
608

602 → Table 1

| Outdoor Work Items | Cost |
|---|---|
| 1. Rip off roof shingles | $300 |
| 2. Resurface and stucco | $2,000 |
| 3. Repair porch damage | $360 |
| 4. Paint porch | $400 |
| Total | $3,060 |

The itemized cost for the outdoor work items are summarized in Table 1. Note that I substituted different paint for DuPont since it is out of stock.

604 → Table 2

The itemized cost for the indoor work items are summarized in Table 2.

| Indoor Work Items | Cost |
|---|---|
| 1. Repaint Cabinets | $300 |
| 2. Plumb sink | $1,500 |
| 3. Tile floor | $3,700 |
| 4. Fix blinds | $200 |
| 5. Reupholster couch | $400 |
| 6. Install hardwood floors | $2,900 |
| Total | $9,000 |

As you requested, the costs of pursuing only the roof and kitchen at this time are summarized in Table 3.

606 →

| Big Items Only | Cost |   |
|---|---|---|
| Roof | $2,300 | =SUM(Table1!B2:Table1!B3) |
| Kitchen | $5,500 | =SUM(Table2!B2:Table2!B4) |
| Total | $7,800 |   |

Table 3

Thanks, John

*Fig. 6*

SYSTEM AND METHOD FOR INTEGRATING SPREADSHEETS AND WORD PROCESSING TABLES

RELATED APPLICATIONS

This patent application claims priority to U.S. patent application Ser. No. 09/599,809, titled "System and Method for Integrating Spreadsheets and Word Processing Tables", filed on Jun. 21, 2000, commonly assigned herewith, and hereby incorporated by reference.

TECHNICAL FIELD

This invention relates to computer programs, and particularly, to word processing and spreadsheet programs. More particularly, this invention pertains to an architecture for integrating spreadsheets and word processing tables.

BACKGROUND

Word processing and spreadsheet programs are two well-known and widely used software applications. Word processing programs permit users to draft letters, write books, and create other word-centric documents on a computer. Word processing programs are typically designed with the author in mind by offering tools and user interfaces that make writing easier, such as edit functions (e.g., cut, copy, paste, find, replace, etc.), spell and grammar checking, document formatting, and the like. Examples of word processing programs include "Word" from Microsoft Corporation and "WordPerfect" from Corel Corporation.

Spreadsheet programs enable users to create financial records, accounting spreadsheets, budgets, and other number-centric documents on a computer. Spreadsheet programs are developed with the accountant in mind, focusing on tools and user interfaces that simplify data entry and data manipulation. Spreadsheets typically offer such functionality as in-cell formulas, automatic recalculation as data changes, multi-sheet referencing, cell formatting according to data type (e.g., dates, currency, percentages, etc.), and the like. One example of a spreadsheet program is the "Excel" application from Microsoft Corporation.

In the past, computer users who wanted to create primarily word-based documents would select a word processing program, while users who wished to produce number-oriented documents turned to spreadsheet programs. In some situations, however, word processing users might need to include numbers and a spreadsheet "look" to an otherwise word-dominated document.

To accommodate such crossover situations, word processing programs evolved to offer tables, a visual structure that could be used to hold and organize numbers and other types of data. Tables arrange data in columns and rows, thereby emulating the spreadsheet "look". Word processing users can insert a table, modify its layout, and change cell formats to achieve a specific visual appearance to their data. Some tables even support rudimentary functions, such as adding a set of contiguous cells. However, these functions do not automatically recalculate. Accordingly, while visually similar to spreadsheets, word processing tables do not support full spreadsheet functionality.

More recently, object-oriented programming and OLE technologies have been used to provide a richer integration experience. With OLE, word processing users who want greater functionality can embed spreadsheet objects into their word processing documents, instead of tables. Essentially, this is akin to embedding an "Excel" spreadsheet (or other spreadsheet program) into a document running on the "Word" program (or other word processing program). The embedded object carries sufficient functionality to allow the user to enter formulas, format cells, recalculate functions, and do all of the things he/she would normally be able to do on a spreadsheet program.

Though the embedded spreadsheet visually resembles a table and provides the desired spreadsheet functionality, it logistically remains a separate program that must be invoked by the user. OLE requires that both types of application programs—a word processor and a spreadsheet—be installed on the computer. When the user wants to update the embedded spreadsheet, the user invokes the spreadsheet object by moving a mouse pointer to anywhere on the embedded object and double clicking the left mouse button (or via some other actuation mechanism). In response, an instance of the spreadsheet program is executed and the spreadsheet changes appearance from a "table look" to a reduced size spreadsheet program with numbered rows and lettered columns and program specific menus. In this state, the user can change functions, modify data, reformat the spreadsheet, and perform other spreadsheet tasks. When the user is finished, the user returns focus to the word processing document by moving the mouse pointer outside the spreadsheet object and single clicking the left mouse button.

While the OLE approach offers the full spreadsheet functionality within a word processing document, the process is somewhat sophisticated and typically performed by experienced users who are familiar with both spreadsheets and word processing programs. For novice or less experienced users, it may be confusing to see a table and not appreciate the difference between a word processing table and a full-functioning embedded spreadsheet object. From the user standpoint, different operations are used depending upon whether the visible structure is a table or a spreadsheet. Furthermore, common services such as text formatting, spell checking, and the like do not "tunnel" into the embedded OLE objects and thus, the user is forced to run such services for both the document and the embedded spreadsheet.

Thus, even though the final appearance may be visually similar, word processing tables and spreadsheets provide two completely separate mechanisms for displaying information. Accordingly, there remains a need for better integration of spreadsheet functionality into word processing tables.

With the rapidly growing popularity of the Internet, many documents delivered to and rendered on computers are written in markup languages, such as HTML (hypertext markup language). Markup languages can allow authors to easily construct a desired visual layout of the document. Some HTML documents provide tables that look and function as if they were integrated with the surrounding text. For instance, financial Websites commonly offer informative discussions on retirement planning, college savings, or buying a house and include with those discussions one or more tables that invite the user to fill in their personal financial information and goals. When the user finishes entering the data fields, the document appears to make on-the-fly calculations and present the results together with the discussions.

Despite the appearance of in-document calculations, the HTML document is nothing more than an electronic form that receives data entered by the user. When the user completes entry, the HTML document is submitted to a Web server that extracts the user data and makes the appropriate financial calculations. The server places the results in another HTML document and serves the document back to the user's computer. The submit and reply occur very quickly, so the user may be unaware that the HTML document holding the results is different than the HTML document into which he/she initially entered data. In any event, the traditional separation between spreadsheets and tables has persisted into the Web-based era.

SUMMARY

A system architecture integrates spreadsheet functionality into tables commonly used in word processing programs and HTML documents. The architecture presents a table user interface (UI) that appears a part of the document, and may be surrounded by text and other document elements. In an HTML document, for example, the table is an HTML element constructed along with other elements and rendered together as an integrated document. Once rendered, the table UI visually resembles a table in a non-editing mode and a spreadsheet in an editing mode. The feel of the table, however, remains much like a word processing table in that a user can type multiple paragraphs, create lists, split cells, and so forth. However, unlike typical word processing tables, the table supports full spreadsheet functionality.

Underlying the table UI, one implementation of the architecture separates data handling functions from presentation functions. The architecture includes a table appearance manager to manage how the table appears in a document including such characteristics as table resizing, selection, cut, copy, paste, split, merge, table formatting and so on. The architecture also has a spreadsheet functionality manager to manage the spreadsheet functions for the table, such as recalculation, formula handling, sorting, referencing, and the like.

The bifurcated architecture supports cross-table referencing in which a cell in one table can reference a cell in another table in the same document, even though the tables are separate from one another. As part of the cross-table referencing, the architecture allows a user to reference the cell in the other table using a reference edit operation (e.g., move pointer to cell and click to capture content in the cell). The architecture further accommodates automatic universal recalculation throughout all tables in the document. Thus, when a user modifies the contents of one table, the architecture automatically recalculates any formulas in any tables affected by the modification.

The architecture also supports nested table structures in which one table is nested within a cell of another table. Many other architectural features and UI features are also described.

BRIEF DESCRIPTION OF THE DRAWINGS

FIG. 2 illustrates a screen display of a rendered document having a single table that is capable of spreadsheet functionality. In FIG. 2, the table exhibits a "table look" during a non-editing mode.

FIG. 3 illustrates a screen display of the rendered document, where the table exhibits a "spreadsheet look" during an editing mode.

FIG. 5 illustrates a screen display of a rendered document having multiple tables. In particular, FIG. 5 shows nested tables, where one table is inserted into a cell of another table, and the ability to reference from one table to the other table.

FIG. 6 illustrates a screen display of a rendered document having multiple tables and a free floating field that appear in an edit mode. FIG. 6 demonstrates cross-table referencing, and edit referencing from a free floating.

DETAILED DESCRIPTION

This disclosure describes an architecture that integrates spreadsheet functionality into tables commonly used in word processing programs and HTML documents. The architecture provides a single mechanism for users to combine the best features of a word processing table with the best features of a spreadsheet engine.

In the described implementation, the architecture provides the integrated table and spreadsheet in a document written in a markup language (e.g., HTML). In this manner, the user is afforded the rich HTML formatting options of both text and tables, including table layout changes (e.g., merging and splitting cells), as well as the data specific calculation and formatting features that are traditionally associated only with a separate spreadsheet application. However, it is noted that the architecture may be useful in other document types that are not rooted in a markup language.

Architecture

Figure 1:
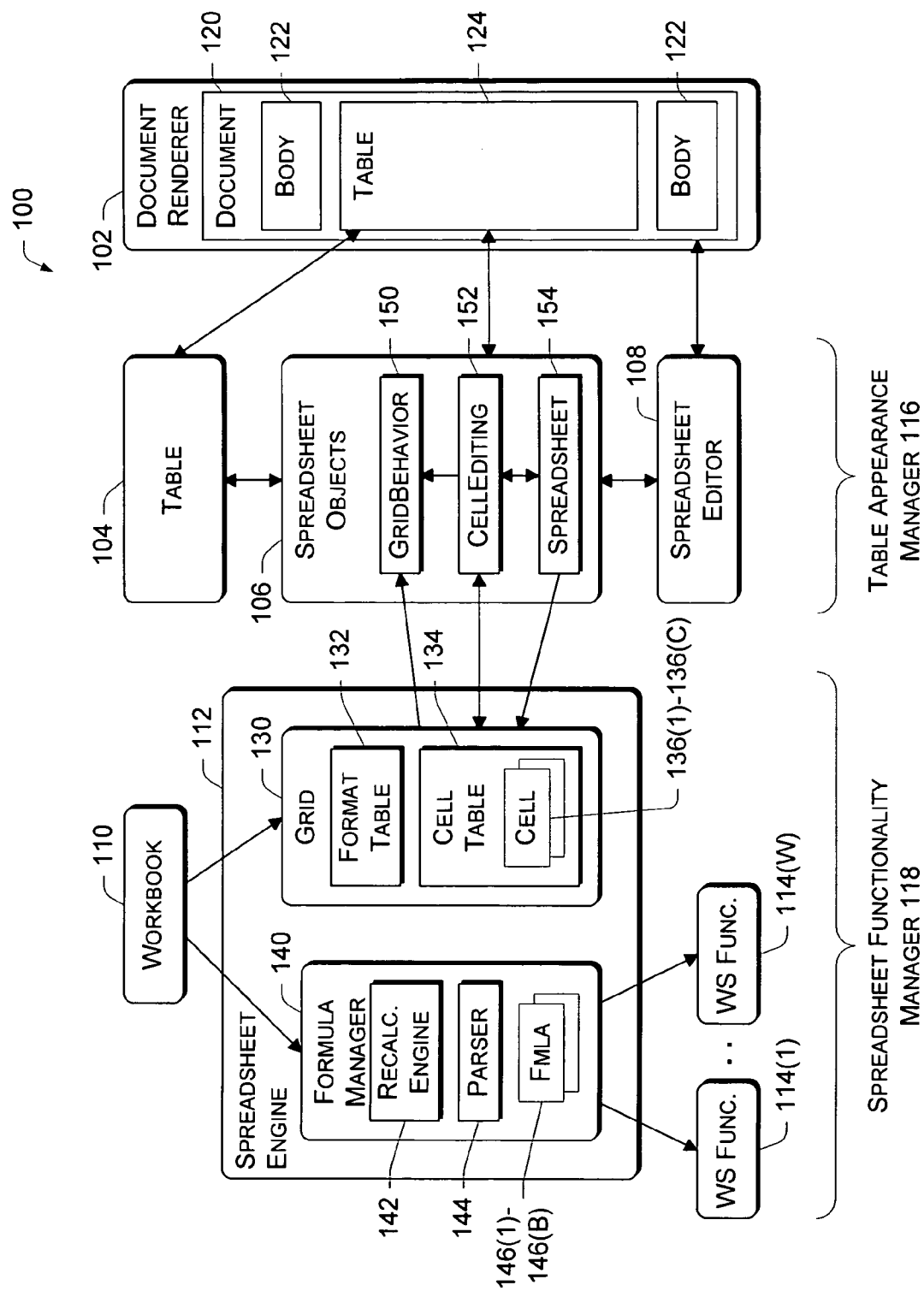
FIG. 1 is a block diagram of an exemplary architecture for integrating spreadsheet functionality into word processing tables.

FIG. 1 shows the architecture 100 that integrates spreadsheet functionality into word processing tables. The architecture 100 may be implemented on a standalone computer, a network server computer, a network client computer, or distributed at both the server and client. The architecture 100 includes a document renderer 102, a table object 104, spreadsheet objects 106, a spreadsheet editor 108, a workbook 110, a spreadsheet engine 112, and one or more non-core worksheet functions 114(1)-114(W) that may be optionally used by the spreadsheet engine 112.

The architecture 100 separates data handling functions from presentation functions of the integrated table/spreadsheet. In this manner, the architecture may be characterized as a cooperation of two system managers: a table appearance manager 116 and a spreadsheet functionality manager 118. The table appearance manager 116 manages how the table appears in a document and facilitates such tasks as table resizing, selection, cut, copy, paste, split, merge, table formatting and so on. The table appearance manager 116 includes the table object 104, the spreadsheet objects 106, and the spreadsheet editor 108. The spreadsheet functionality manager 118 manages the spreadsheet functions for the table, such as recalculation, formula handling, sorting, referencing, and the like. The spreadsheet functionality manager 118 includes the spreadsheet engine 112 and worksheet functions 114. With the bifurcated architecture, the spreadsheet functionality manager 118 is not concerned with the table layout or other visual features, and the table appearance manager 116 is not concerned with data management, formulas, and recalculation processes.

The bifurcated architecture 100 is advantageous in that it supports cross-table referencing among multiple tables. It also allows reference editing during formula entry to allow convenient selection of other cells and capturing of their contents as variants used in the formula. The architecture further facilitates automatic universal recalculation throughout all tables in the document in response to user modification of a single table.

A document 120 is constructed and rendered on the document renderer 102. The document 120 combines one or more text-based body elements 122 with one or more tables 124. For discussion purposes, the document 120 is written in a markup language, such as XML (extensible markup language). XML documents have an advantage in that they can be transformed using XSL (extensible stylesheet language) and rendered directly as HTML (hypertext markup language). In this case, the renderer 102 may be implemented as a browser or other application that handles and renders HTML documents. The table 124 is thus rendered as an HTML table.

FIG. 2 shows an example document 120 that has body elements 122(1), 122(2), and 122(3) and a table 124 situated between body elements 122(2) and 122(3). In this example, the document 120 is a letter written to Mr. Jones describing various home improvement projects and the costs associated with the projects. In FIG. 2, the table 124 is in a non-editing mode and resembles a standard word processing table with three columns 202(1)-202(3) and five rows 204(1)-204(5).

FIG. 3 shows the same document 120 when the user is editing the table 124. Notice that table 124 now "looks" like a spreadsheet more than a traditional table. The table 124 has integrated column headers 302(1), 302(2), and 302(3), as well as integrated row headers 304(1)-304(6). The table 124 has a column expansion control 306 and a row expansion control 308 to permit easy expansion of the table.

In this example, the user is entering a summation formula in cell C6. Using a mouse pointer 310, the user is referencing an array of cells C2 through C5 for entry into the formula. Upon confirmation (e.g., releasing the left mouse button), a reference to the cells C2-C5 are inserted into the summation formula in cell C6 and the formula is calculated to add the dollar amounts in column C. The result of $12,060 is inserted into cell C6. The many features of the table user interface are discussed in greater detail below under the section heading "User Interface Features".

With reference again to FIG. 1, the table and spreadsheet objects 104 and 106 provide editing functionality for the table 124, including such functions as table resizing, selection, cut, copy, paste, split, merge, table formatting, and a host of other rich spreadsheet events. The spreadsheet engine 112 provides the spreadsheet functionality for the table 124, including such functions as formula creation, reference editing, recalculation, and the like. Architecturally, the table and spreadsheet components are separate from one another, although the spreadsheet relies on the table and the table provides special notifications and events to help the spreadsheet. This allows either component to add additional functionality without directly affecting the other component.

The spreadsheet engine 112 includes a grid object 130 that receive events indicative of user activity in the table 124 and coordinates actions among various objects. There is one grid object 130 for each table created in the document 120. The workbook 110 tracks all grid objects 130 to resolve any cross-table referencing. Upon creation, the grid object 130 registers with the workbook 110 so that it can participate when tables are updated. The grid object keeps an interface to the spreadsheet objects 106 (this is technically a browser behavior but could be any object) to fetch values from the HTML tree maintained at the renderer 102.

The grid object 130 maintains two tables: a format table 132 and a 11 cell table 134. The format table 132 holds information about the data format of each cell in the table 124. For instance, the cell may contain dates, numbers, dollar amounts, percentages, and so forth. The cell table 134 stores the actual data for each cell in the table 124. In the example shown in FIG. 3, the format table 132 would contain information that cells A1-A6, B1-B6, and C1 are text and cells C2-C5 are formatted as currency in U.S. dollars.

The cell table 134 holds the actual data in the cells of the table 124, such as text, values, and formulas. The cell table 134 stores pointers to multiple cells 136(1)-136(C), one for each cell in the table. Each cell 136 is an object with a variant containing the parsed value of the cell and a reference to complete information about the cell. If the cell contains text or numeric data (e.g., cells A1-A6, B1-B5, and C1-C5 in FIG. 3), it is stored directly in the variant. Formulas, such as the summation formula in cell C6 of FIG. 3, are stored as variants with a pointer to the appropriate formula object maintained by the formula manager 140 (discussed below).

The spreadsheet engine 112 includes a formula manager 140 to handle all formulas and parsing duties for formulas, data values, and references (e.g., D4:E23). The workbook 110 serves as the linkage between the formula manager 140 and the registered grids 130. The formula manager 140 maintains a recalculation engine 142 that performs recalculation of all formulas in response to event changes in the table. In one implementation, the recalculation engine 142 maintains the formulas for a document in a bi-directional linked list, sometimes referred to as the "formula chain". Following a recalculation event (e.g., user entry of a new data value or new formula), the recalculation engine 142 traverses the list, evaluating formulas that may be affected by the event.

If the current formula depends on other formulas that have not yet been evaluated, the current formula is moved to the end of the list. After one recalculation pass, the formula list is organized in natural order and will not need to be reordered during subsequent recalculations unless new formulas are added. If recalculation comes to a formula that has already been bumped to the end of the list and discovers that this formula still relies on not-yet-calculated dependencies, the formula contains a circular reference. In this case, the recalculation engine returns a circular error.

The formula manager 140 also has a parser 144 that parses the formulas. In one implementation, the parser 144 is a recursive descent parser that extracts tokens from a stream and appends them to an array of character-size operation types and a parallel array of variant operands. When done, the parser 144 creates a new formula object 146 and gives it the two arrays of parsed information. The formula manager 140 therefore maintains one or more formula objects 146(1)-146(B) that contain formula information, including the parsed formula expression returned by the parser 144, the current result, the type of formula, and the current formula state.

The parser 144 is preferably a delay parser that parses cells only when necessary, such as the first time that a formula has been loaded or the first time a value has been edited or referenced. Most cells in the table, however, will not contain a value that is referenced by a formula, so non-formula cells are only parsed as needed. If a cell is found to contain a formula when the table is loaded, the cell is parsed immediately and added to the recalculation chain. If the cell does not contain a formula, it is left unparsed until a formula requires its value.

In one implementation, there are three types of formulas: normal, semi-calculation, and non-calculation. The normal formula is reevaluated only when its dependencies change. The semi-calculation formula is reevaluated every time the recalculation engine 142 performs a recalculation operation. The non-calculation formula is never evaluated at all. Non-calculation formulas are a special formula type for handling nested tables (i.e., a table within a table) and free floating fields (i.e., a single table cell) that is nested within tables or other free floating fields.

Consider the case of an inner table nested inside a cell of an outer table. If the inner table contains a formula that changes to a different value following recalculation, the value of the outer table's cell will also change. Such a dependency is not encoded anywhere, since there is no formula in the outer table attached to the inner table. In such cases, a non-calculation formula is set in the outer table's cell to re-fetch the result value from the inner calculation. Thus, it participates in the normal dependency management of recalculation and all references to the outer table are updated when appropriate. Nested tables are described below in more detail.

In one implementation, the formula objects 146 are owned by a COM wrapper (not shown), which is in turn held onto by a cell object 136 in the grid 130 where the formula resides. The formula objects 146 are themselves part of the bi-directional linked list of formulas maintained by the recalculation engine 142. The formula objects 146 contain references to their home row and column and to the cell object 136 in grid 130. The references allow the recalculation engine 142 to travel down the recalculation chain with formulas from several tables and easily determine to which table a given formula belongs. Many operations, from formula saving to table deletion, depend on this ability to traverse the chain.

The formula manager 140 also parses referenced cell groups. As examples, the formula manager 140 parses "A5" as a cell reference, "D4:E23" as a compound rectangular reference, "$F$30" as an absolute reference, "Table5!D5" as a cross-table reference, "Field3" as a whole-table cross-table reference, "A5:D5 B3:B6" as an intersection, and "D3,E4" as a union.

The non-core worksheet functions 114(1)-114(W) are optional elements. Examples of such functions include analysis functions, statistical functions, and trigonometric functions. The modular architecture 100 makes it flexible to remove unwanted worksheet functions or add new worksheet functions.

The spreadsheet object 106 is a counterpart to the grid object 130 located outside of the spreadsheet engine. There is one pair of a spreadsheet object 106 and a grid object 130 per table 124. The spreadsheet objects 106 define a behavior that receives events from the document renderer 102, processes them a little, and passes the events onto the grid object 130. In response to the events, the grid object 130 updates the per-table cell data in cell table 134 and/or formatting information in format table 132.

The spreadsheet behavior 106 has three objects: GridBehavior 150, CellEditing 152, and Spreadsheet 154. The GridBehavior object 150 provides a layer of abstraction between the grid object 130 and individual HTML table cells and allows the grid object 130 to access HTML values and styles. The GridBehavior object 150 wraps the HTML elements in a common interface so that the grid 130 does not need to know the particular structure of the HTML table. Additionally, the GridBehavior object 150 manages table-specific portions of a "reference edit" operation.

The CellEditing object 152 and Spreadsheet object 154 interact directly with an HTML tree and the table behavior 104 to provide the grid 130 with events. The Spreadsheet object 154 is responsible for recording undo records for actions affecting the spreadsheet.

The CellEditing object 152 manages user-level editing of cells. It processes events related to user edits of in-cell data values and provides some editing user interface (UI) elements, including the formula edit box that permits user edits of formulas. When editing a formula, a floating formula edit box is provided above the cell's location and resized as necessary to accommodate the formula. The localized edit box eliminates a potential UI problem of forcing the user to stuff the entire formula into the table cell, which would cause the table (or paragraph) to resize strangely as the user brings up and dismisses the formula to be replaced by its result.

The CellEditing object 152 also supports the reference edit operation when the formula edit box is presented. As noted above, the reference edit operation allows the user to visually reference cells using a mouse pointer (or other focus mechanism) and in response, inserts a reference to that cell data in the current formula edit box. The formula edit box is described below in more detail. The CellEditing object 152 is only present when a cell is being actively edited.

The spreadsheet objects 106 handles top-level duties such as inserting a table or a free floating field and routing commands to the appropriate table based on the current selection in the document 120. The spreadsheet objects 106 also creates and manages the workbook 110.

The integrated table and spreadsheet model eliminates the need for the user to choose the structure of data within a document prior to creating that document. Historically, if the user needed more control over the presentation of the tabular data, the user tended to select a word processing application. On the other hand, if the user required computations over the data, the user typically chose a spreadsheet application. The integrated architecture allows the user to combine several different types of data within one document.

Additionally, by integrating spreadsheet functionality inside a table, the user can build the document around the table. In spreadsheet applications, the user is restricted to the grid layout for all document content. In the integrated architecture, users may create a rich document that contains multiple tables, each with data that can be formatted as values and used in calculations throughout different tables.

Architecture with Free Floating Field

Figure 4:
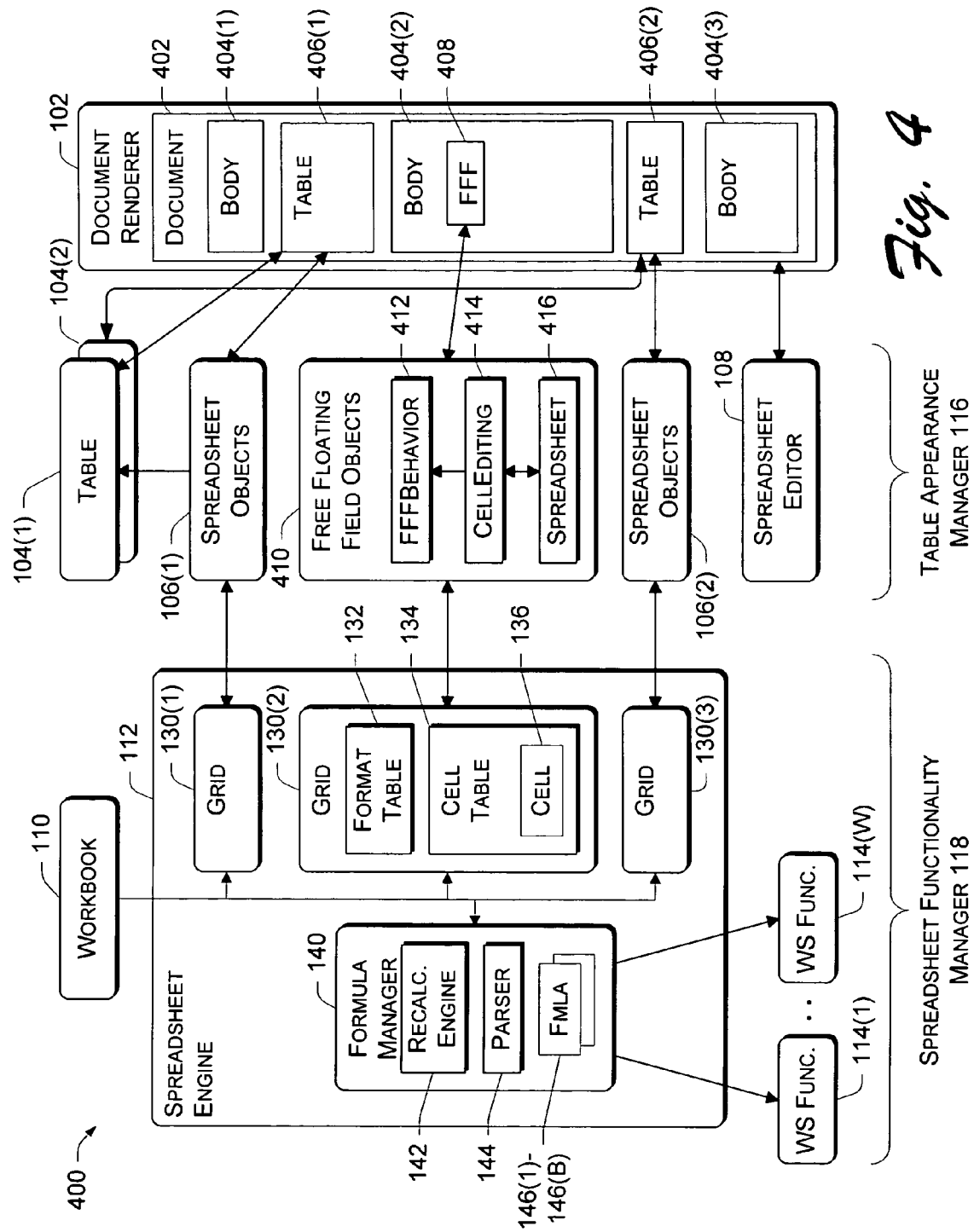
FIG. 4 is a block diagram of another exemplary architecture for integrating spreadsheet functionality into word processing tables. The architecture of FIG. 4 illustrates an extension of the FIG. 1 architecture by supporting multiple tables and a free floating field.

FIG. 4 shows an architecture 400 that is similar to that shown in FIG. 1, but illustrates how the architecture scales to accommodate multiple tables within a single document as well as free floating fields. The architecture 400 may be implemented at a standalone computer, a network server computer, a network client computer, or distributed at both the server and client.

In FIG. 4, the document 402 rendered by renderer 102 has multiple text-based body portions 404(1)-404(3), two tables 406(1) and 406(2), and one free floating field (FFF) 408. The free floating field 408 is akin to a spreadsheet value that may be inserted anywhere in the document, including in the middle of a text-based body and appearing as a natural part of the text.

FIGS. 5 and 6 show two examples of documents that have multiple tables and/or a table with a free floating field. In FIG. 5, a document 500 contains a first or outer table 502 and a second or inner table 504 nested within cell B3 of the outer table 502. The ability to nest tables is one feature of this architecture that conventional spreadsheet programs do not provide. In FIG. 6, a document 600 has three tables 602, 604, and 606, and a free floating field 608 that is currently being edited.

With reference again to FIG. 4, the spreadsheet engine has a grid object for each table and free floating field in the document 402, as represented by grid objects 130(1), 130(2), and 130(3). In addition, there is one spreadsheet behavior for each table 406 in the document 402, as represented by spreadsheet objects 106(1) and 106(2). The architecture 400 also has one free floating field behavior 410 for each free floating field 408 in the document. As a result, there is one pair of corresponding grid objects and spreadsheet/FFF behaviors for each table or free floating field in the document 402.

The grid object 130(2) used to support the free floating field object 410 is essentially the same as the grid objects 130(1) and 130(3) used to support the tables, which are described above in detail. One minor difference is that the grid object 130(2) contains only one cell object 136 because the free floating field 408 is similar to a table with only one cell.

The free floating field behavior 410 has three objects: an FFFBehavior object 412, a CellEditing object 414, and a Spreadsheet object 416. The CellEditing object 414 and Spreadsheet object 416 are identical to those in the spreadsheet behavior 106, as described above with reference to FIG. 1. The FFFBehavior object 412 takes the place of the GridBehavior object in the context of free floating fields. Like the GridBehavior, the FFFBehavior object 412 provides an interface for the grid object 130(2) and manages "reference edit" operations for the free floating field.

Exemplary Computing Environment

Figure 7:
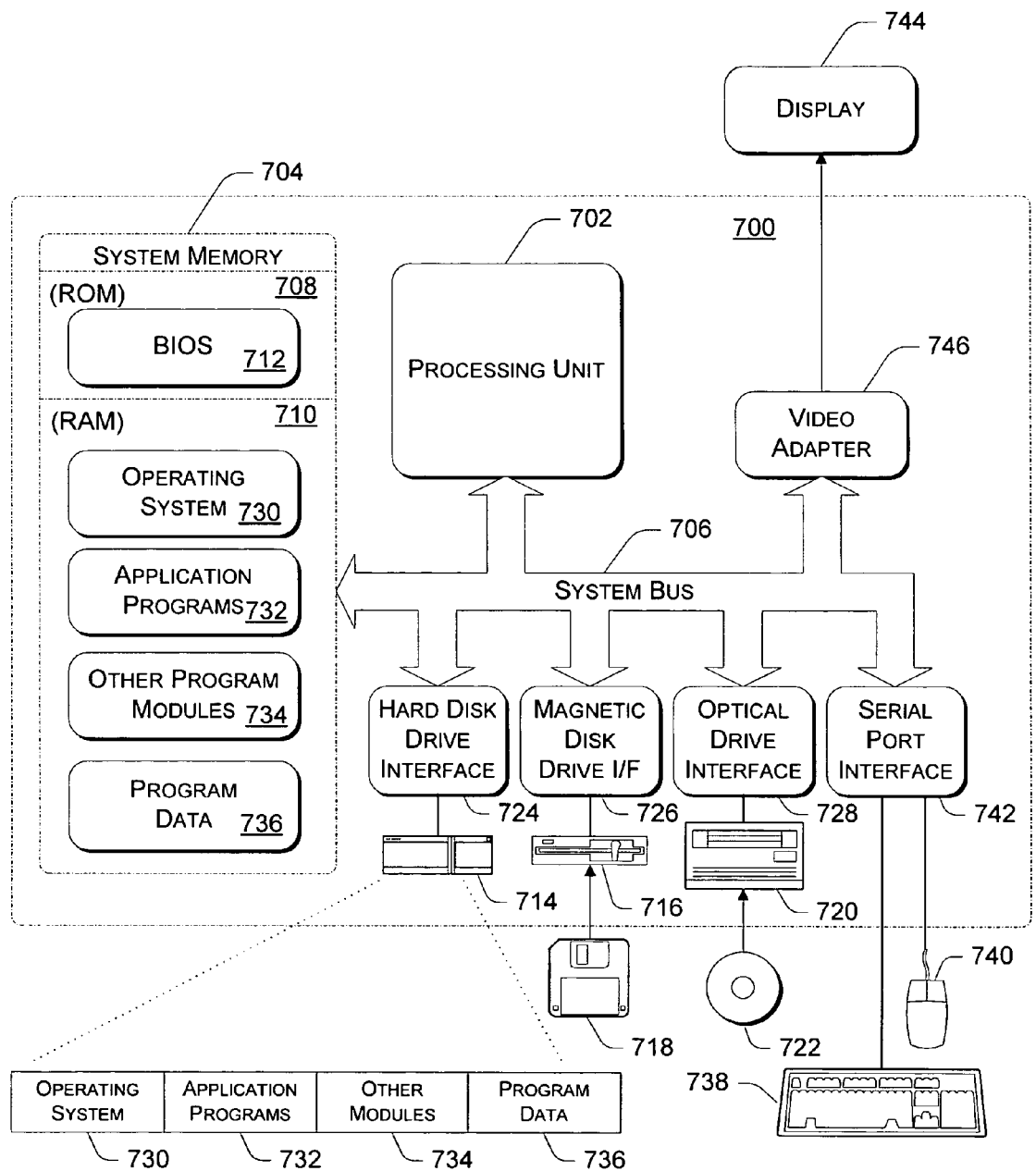
FIG. 7 is a block diagram of an exemplary computer that implements the architectures of FIGS. 1 and 4.

FIG. 7 illustrates an example of an independent computing device 700 that can be used to implement the integrated spreadsheet/table architectures of FIGS. 1 and 4. The computing device 700 may be implemented in many different ways, including a general-purpose computer (e.g., workstation, server, desktop computer, laptop computer, etc.), a handheld computing device (e.g., PDA, PIM, etc.), a portable communication device (e.g., cellular phone with computing capabilities), or other types of specialized appliances (e.g., set-top box, game console, etc.).

In the illustrated example, computing device 700 includes one or more processors or processing units 702, a system memory 704, and a bus 706 that couples the various system components including the system memory 704 to processors 702. The bus 706 represents one or more types of bus structures, including a memory bus or memory controller, a peripheral bus, an accelerated graphics port, and a processor or local bus using any of a variety of bus architectures. The system memory 704 includes read only memory (ROM) 708 and random access memory (RAM) 710. A basic input/output system (BIOS) 712, containing the basic routines that help to transfer information between elements within the computing device 700 is stored in ROM 708.

Computing device 700 further includes a hard drive 714 for reading from and writing to one or more hard disks (not shown). Some computing devices can include a magnetic disk drive 716 for reading from and writing to a removable magnetic disk 718, and an optical disk drive 720 for reading from or writing to a removable optical disk 722 such as a CD ROM or other optical media. The hard drive 714, magnetic disk drive 716, and optical disk drive 720 are connected to the bus 706 by a hard disk drive interface 724, a magnetic disk drive interface 726, and a optical disk drive interface 728, respectively. Alternatively, the hard drive 714, magnetic disk drive 716, and optical disk drive 720 can be connected to the bus 706 by a SCSI interface (not shown). It should be appreciated that other types of computer-readable media, such as magnetic cassettes, flash memory cards, digital video disks, random access memories (RAMs), read only memories (ROMs), and the like, may also or alternatively be used in the exemplary operating environment.

A number of program modules may be stored on ROM 708, RAM 710, the hard disk 714, magnetic disk 718, or optical disk 722, including an operating system 730, one or more application programs 732, other program modules 734, and program data 736. As one example, the architecture 100 may be implemented as one or more programs 732 or program modules 734 that are stored in memory and executed by processing unit 702. The drives and their associated computer-readable media provide nonvolatile storage of computer-readable instructions, data structures, program modules and other data for computing device 700.

In some computing devices 700, a user might enter commands and information through input devices such as a keyboard 738 and a pointing device 740. Other input devices (not shown) may include a microphone, joystick, game pad, satellite dish, scanner, or the like. In some instances, however, a computing device might not have these types of input devices. These and other input devices are connected to the processing unit 702 through an interface 742 that is coupled to the bus 706. In some computing devices 700, a display 744 (e.g., monitor, LCD) might also be connected to the bus 706 via an interface, such as a video adapter 746. Some devices, however, do not have these types of display devices. Computing devices 700 might further include other peripheral output devices (not shown) such as speakers and printers.

Generally, the data processors of computing device 700 are programmed by means of instructions stored at different times in the various computer-readable storage media of the computer. Programs and operating systems are typically distributed, for example, on floppy disks or CD-ROMs or over the Internet. From there, they are installed or loaded into the secondary memory of a computing device 700. At execution, they are loaded at least partially into the computing device's primary electronic memory. The computing devices described herein include these and other various types of computer-readable storage media when such media contain instructions or programs for implementing the steps described below in conjunction with a microprocessor or other data processor. The service system also includes the computing device itself when programmed according to the methods and techniques described below.

For purposes of illustration, programs and other executable program components such as the operating system are illustrated herein as discrete blocks, although it is recognized that such programs and components reside at various times in different storage components of the computing device 700, and are executed by the data processor(s) of the computer.

It is noted that the computer 700 may be connected to a network via a wire-based or wireless connection to interact with one or more remote computers. In this network context, the computer 700 may be configured to store and execute portions of the architecture 100, while one or more remote computers store and execute other portions of the architecture. For example, the document renderer 102 may reside on one computer, while the remaining components reside on a separate computer. As a result, the architecture is distributed, with various components being stored on different computer-readable media.

General Operation

Figure 8:
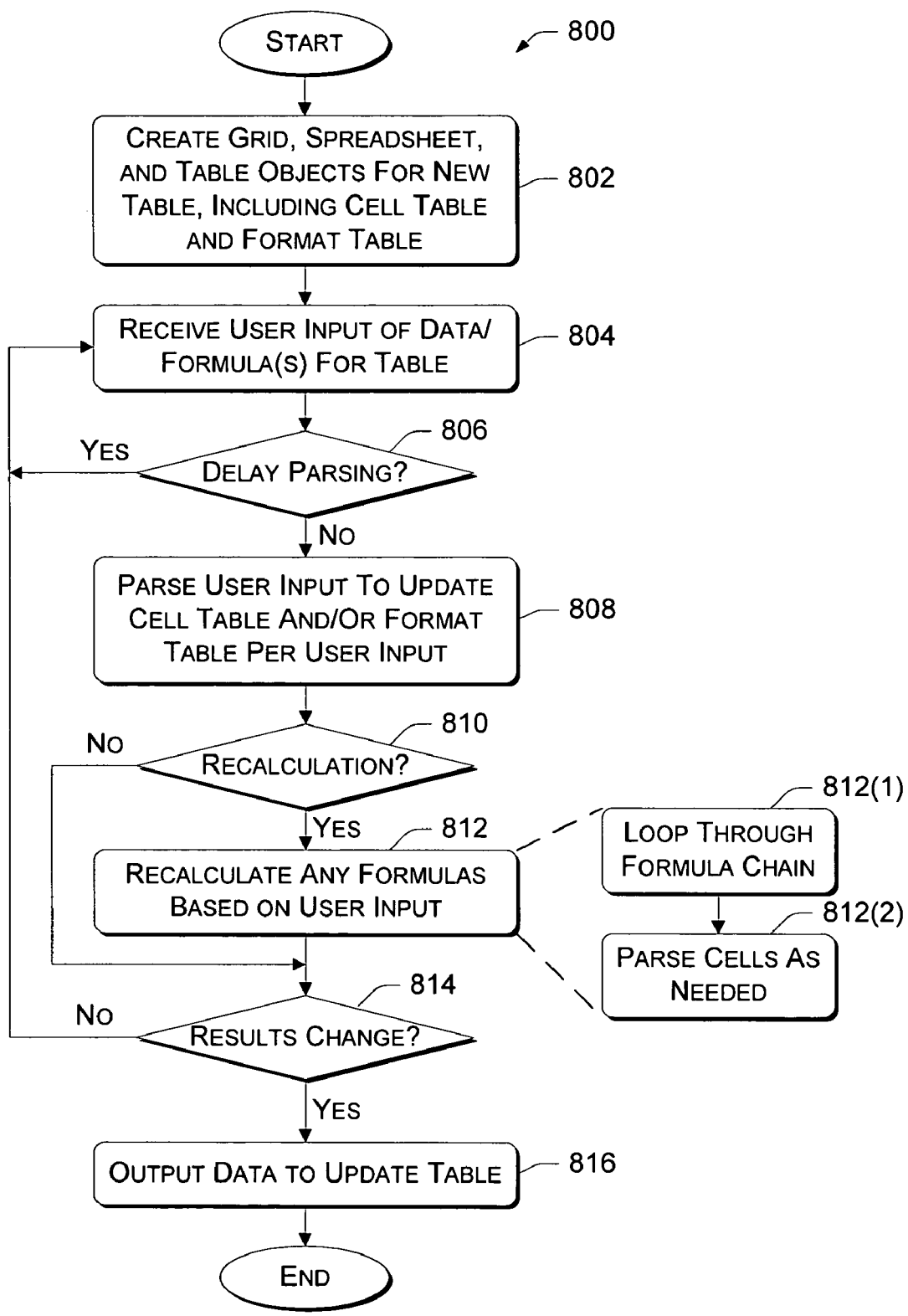
FIG. 8 is a flow diagram of a process implemented by the architectures of FIGS. 1 and 4.

FIG. 8 shows a table/spreadsheet process 800 implemented by the table/spreadsheet architecture 100 of FIG. 1. The process 800 may be embodied in software stored and executed on a computer, such as computing device 700 in FIG. 7. Accordingly, the process 800 may be implemented as computer-executable instructions that, when executed on a processing system such as processor unit 702, perform the operations and tasks illustrated as blocks in FIG. 8.

At block 802, the architecture 100 creates a corresponding set of table, spreadsheet, grid objects 104, 106, and 130 for a new table UI presented as part of the document. In one implementation, the GridBehavior object 150, CellEditing object 152, and Spreadsheet object 154 are initially created for the new table and then the Spreadsheet object 154 creates an associated grid object 130 in the spreadsheet engine 112. The grid object 130 includes a format table 132 and a cell table 134. If this is the first spreadsheet, a workbook 110 is also created. The grid 130 and workbook 110 then create other objects, including the 11 formula manager 140 and cells 136 for each cell in the table being created.

At block 804, in response to the user entering data and/or formulas into the table, the architecture receives the user entry and passes it to the spreadsheet engine 112 for processing. More specifically, in the continuing exemplary implementation, the Spreadsheet object 154 receives a table-parsed notification from the document renderer 102 and passes it along to the grid 130 for the new table. Suppose, for example, the user creates the following table:

| | |
|---|---|
| 7 | 15 |
| 8 | |

The HTML code for this table is as follows:

```
<table>
    <tr><td>7</td><td FMLA="=A1+A2">15</td></tr>
    <tr><td>8</td><td></td></tr>
</table>
```

Using enumeration methods provided by the GridBehavior object 150, four cells 136(1)-136(4) are retrieved, one for each existing cell in the table.

The spreadsheet object 154 receives a data value 7 for cell A1, a data value 8 for cell A2, and a formula for cell B 1, and passes this information onto the spreadsheet engine 112.

At block 806, based on the user input, the architecture determines whether to parse the user-entered information or delay parsing until later. The architecture preferably employs a delay parser that parses cells when necessary, such as the first time that a formula has been loaded or the first time a value has been edited or referenced. Most cells in the table, however, will not contain a value that is referenced by a formula, so non-formula cells are only parsed as needed. If a cell is found to contain a formula when the table is loaded, the cell is parsed immediately and added to the recalculation chain. If the cell does not contain a formula, it is left unparsed until a formula requires its value.

At block 808, assuming that parsing is needed now (i.e., the "no" branch from block 806), the architecture parses the user-entered information and updates the format table 132 and cell table 134 based upon this information. For example, cell A1 is parsed first, although the order is immaterial. The parser 144 evaluates whether a formula exists. In this case, no formula is found and the cell is left unparsed and marked to be parsed later. The corresponding 0,0 entry in cell table 134 is set to point to the unparsed cell 136(1).

Cell B1 is parsed next. Here, the parser 144 finds a formula "FMLA" attribute (i.e., "=A1 +A2") and parses the formula string, returning the appropriate variant. The variant is placed in a new cell 136(2), which is stored in the cell table 134 at the appropriate location 0,1. Additionally, the formula is added to the chain of formulas maintained at the recalculation engine 142.

Cells A2 and B2 are parsed in a similar manner to A1 because neither cell contains a formula, resulting in references to unparsed cells 136(3) and 136(4) being added to the cell table 134. When all cells have been parsed, the recalculation engine initiates the first recalculation to determine actual values to be displayed in cells with formulas.

At block 810, the architecture determines whether recalculation is appropriate. Some user input may not require recalculation, such as insertion of a new data value that is not referenced by a formula. If recalculation is not needed, flow continues at block 814 to determine whether the table needs to be updated in view of the user input.

At block 812, assuming recalculation is appropriate (i.e., the "yes" branch from block 810), the architecture recalculates the various formulas that may have been affected by the user input. In the ongoing example, the act of putting a value into a cell 136 in the cell table 134 triggers a data-changed notification to registered listeners, which includes the grid object 130. The grid object 130 identifies the changed cells and forwards the notification to the formula manager 140, which marks any formulas depending on the changed cells as dirty and in need of recalculation.

The grid object then calls the recalculation engine 142, which loops over the recalculation formula chain and recomputes the variously affected formulas (block 812(1)). While evaluating the formulas in the formula chain, unparsed cells that were previously left unparsed may now be parsed (block 812(2)). In this case, when the formula=A1+A2 is evaluated, the recalculation engine discovers that these cells are unparsed. It immediately asks the parser 144 to fully parse the cells. The parser 144 does so and enters values of 7 and 8 into the cell table 134. The recalculation engine can then evaluate the formula=A1+A2 using the new values that the parser 144 has found.

Once the recalculation engine 142 finishes, it returns control to the workbook 110. The workbook 110 calls back to the recalculation engine 142 to learn which formulas changed as a result of the recalculation cycle. The workbook 110 then locates the grid object 130 that holds the formula and calls it to save the cells that contain formulas whose results changed.

At block 814, the architecture determines whether any results have changed following the recalculation. If no results have changed (i.e., the "no" branch from block 814), process flow continues at block 804 for the next user input. Conversely, if the results have changed (i.e., the "yes" branch from block 814), the architecture 100 loads an updated table with the modified values and renders the updated table as part of the document (block 816).

It is noted that the above example assumed that the user entered data or a formula. The user may also change the format of one or more cells in the table. The process 800 handles format changes in essentially the same way, but accounts for those changes in the format table 132 rather than the cell table 134.

User Interface Features

The architecture 100/400 supports many user interface (UI) features in the rendered document to convey to the user that the table is not only a table, but also a full functioning spreadsheet. These UI features are described separately below, with reference to FIGS. 2, 3, 5, and 6. Hand-in-hand with these features are the underlying operations and inner workings of various components in the architecture 100/400. These aspects will be described in more detail later in this disclosure under the heading "Functionality Features".

One of the primary benefits of integrating spreadsheet functionality into tables is that the user need no longer think in terms of whether the document should be primarily a spreadsheet document produced by a spreadsheet application (e.g., an ".xls" file from the "Excel" program) or primarily a word processing document produced by a word processing application (e.g., a ".doc" file from the "Word" program). Instead, the user creates an HTML document (or other markup-based document, such as an XML document) that can have both text and spreadsheet/table components. By integrating spreadsheet functionality inside a table, the user can build the document around the table without being restricted to the grid layout for all document content, as in the case of spreadsheet programs.

Integrated Headers

The table 124 toggles between a "table look" (FIG. 2) and a "spreadsheet look" (FIG. 3) depending upon whether the user is editing the table. The spreadsheet look may be invoked in a number of ways, including by actively editing a cell, by hovering a pointer over the table, or by some other activity. As illustrated in FIG. 3, the spreadsheet look includes column headers 302(1)-302(3) and row headers 304(1)-304(6) that integrate with the table columns and rows, respectively. Visually, the column headers 302 appear just above the columns and are labeled with letters A, B, C, etc., where as the row headers 304 reside to the left of the rows and are labeled with numbers 1, 2, 3, etc.

Smart Selection

When the user selects a cell, the architecture intelligently discerns the type of content in the cell. For instance, the architecture determines whether the cell contains a data value, text, or a formula. If the selected cell contains text or a value, the UI exhibits the selection as a character-based cursor ready for cell editing. If the selected cell contains a formula, the UI exhibits the selection by highlighting the entire result of the formula. A second selection gesture will allow the user to edit the formula within the formula edit box.

Key Processing

Certain keys have different interpretations depending upon the contents of the cell. This dynamic interpretation accommodates the competing interests of a word processing table and a spreadsheet. As an example, the "Enter" key typically means return in word processing, whereas it means move to the next cell in a spreadsheet program.

If the cell contains text (e.g., cells A1-A6, B1-B5, and C1 in FIG. 3), the architecture interprets this cell as primarily being a word processing-based cell and treats the keys as if the user were working within a word processing application. Thus, an "Enter" key means return, a "tab" key means tab over some distance, the "=" key typed in anywhere but the beginning of the cell means the equals symbol without denoting a formula, and so forth.

If the cell contains a formula or a data value (e.g., cells C2-C6 in FIG. 3), the architecture interprets this cell as primarily being a spreadsheet-based cell and treats the keys as if the user were working within a spreadsheet application. Thus, an "Enter" key and "tab" key mean navigation commands to move to the next cell, the "=" key at the beginning of a cell implies the start of a formula, and so forth.

Table Expansion

Spreadsheet users are accustomed to the look and feel of an infinite grid. While the spreadsheet look of FIG. 3 does not have the same infinite grid feel, the table 124 has a column expansion control 306 and a row expansion control 308 that allow easy addition of columns and rows, respectively. The controls 306 and 308 include an actuatable addition icon together with a dashed column/row to suggest that additional columns and rows may be added by simply actuating the icon.

Resize Behavior

The table 124 preserves column width and wraps text as the user enters sentences and phrases. In FIG. 3, notice that item 2 in cell B5 wraps within the cell, rather than resizing the column width to accommodate the entire item.

Formula Edit Box

The architecture provides a formula edit box for inserting or editing a formula in a table cell or free floating field. The formula edit box overlays the original cell in which the formula resides and initially defaults to the size and shape of the cell. If the formula exceeds the initial size, the formula edit box is resized to accommodate the formula. During resizing, the formula edit box initially grows horizontally in length, and then vertically in depth. The underlying table does not resize. The ability to resize the local formula edit box, rather than the cell and the table, eliminates a potential UI problem of watching the table resize strangely as the user clicks into and out of the cell containing the formula.

Examples of the formula edit box are illustrated in FIGS. 3, 5 and 6. In FIG. 3, a formula edit box 312 hovers over cell C6 to accept the summation formula. In FIG. 5, a formula edit box 506 floats above cell C3 and is resized to accommodate the expanded formula. Notice that the underlying table cell C3 is not resized, but remains the same size and shape within the table. In FIG. 6, a formula edit box 610 resides above the free floating field 608 and is resized to hold the long formula.

Reference Edit

The table 124 allows the user to perform a reference edit operation, in which the user references one or more cells to extract their data values for inclusion in a formula in another cell. In FIG. 3, the user begins entering a summation formula (i.e., "=SUM(") in the formula edit box 312 above cell C6. The user then references cells C2 through C5 using a pointer 310 or some other mechanism. The referenced cells C2:C5 are highlighted or otherwise indicated as being selected, as represented by the bold rectangular box around the cells.

When the user finishes selecting the desired cells (e.g., releasing the left mouse button after highlighting cells C2:C5), the referenced cells are added to the summation formula in formula edit bock 312 (i.e., "=SUM(C2:C5)"). Upon further confirmation by the user (e.g., pressing the "Enter" key), an update event is generated and the architecture 100 recalculates the formula and updates the cell C6 to display the sum of the cells C2:C5, or $12,060, in cell C6.

Cross-Table Referencing and Universal Recalculation

The architecture 100 supports cross-table references where a cell in one table contains a formula referencing a cell in another table. The architecture 100 also supports cross-table reference edit operations that permit a user to reference a cell in one table or a free floating field when entering a formula into another table.

FIG. 6 illustrates cross-table referencing, where table 606 contains references to tables 602 and 604. All three tables are separate and independent from one another, and architecturally have their own set of grid, spreadsheet, table objects 130, 106, and 104. In FIG. 6, cell B2 in table 606 contains a summation formula for adding values in cells B2 and B3 of table 602 (i.e., =SUM(Table1 !B2:Table1!B3)). Cell B3 in table 606 contains a summation formula for adding values in cells B2 through B4 in table 604 (i.e., =SUM(Table2 !B2: Table2 !B4)).

The ability to cross-reference other tables or free floating fields is beneficial in that all tables and free floating fields can be universally updated for any change in just one of the tables. For example, suppose the user changes the value in cell B2 of table 602 from $300 to $400. As a result of this change, table 602 is updated to reflect the new value $400 and the total amount in cell B6 is updated from $3,060 to $3,160. Additionally, the value in cell B2 of table 606 is updated to $2,400, causing the total amount in cell B4 in table 606 to be changed from $7,800 to $7,900.

The cross-table referencing is a significant improvement over conventional OLE techniques of embedding a spreadsheet object within a word processing document. With OLE, each spreadsheet object is independent of another and cannot reference cells in one another automatically. Since there is no cross-referencing ability, the OLE approach cannot support universal updating throughout the document's spreadsheets as a result of changing a value in one spreadsheet.

Free Floating Field Reference Edit

The reference edit operation is also available when entering a formula for a free floating field. Consider the document 600 in FIG. 6. The writer is attempting to summarize the total cost of all work items in the opening paragraph. Rather than typing in a hard value, the user decides to insert a free floating field 608 that will hold the total for the job. By using a free floating field 608, the amount can be automatically updated as other estimates in the underlying tables are modified.

Using a reference edit operation, the user can enter the formula in the edit box 610 for free floating field 608 by selecting cell B6 in table 602 to capture element "Table1!B6" and then selecting cell B8 in table 604 to capture element "Table2!B8". When the user confirms this formula, the formula edit box 610 disappears and the total value of "$12,060" is inserted into the free floating field 608.

In the event the user subsequently changes the estimate of any item in tables 602 or 604, the total value in free floating field 608 is automatically updated. Extending a previous example, suppose the user changes the value in cell B2 of table 602 from $300 to $400. As a result of this change, table 602 is updated to reflect the new value $400 and the total amount in cell B6 is updated from $3,060 to $3,160. The value in cell B2 of table 606 is updated to $2,400, causing the total amount in cell B4 in table 606 to be changed from $7,800 to $7,900. Additionally, the total amount in free floating field 608 is updated from $12,060 to $12,160. All of the updating throughout the tables and free floating fields is performed automatically in response to the user's change of a single cell in a single table.

It is further noted that a free floating field may reference another free floating field. For instance, another free floating field may be added in document 600 to reference the first free floating field 608, or a combination of the free floating field 608 and a table cell in tables 602, 604, and 606.

Nested Table

The architecture 100 supports tables nested within one another. FIG. 5 illustrates a situation in which an inner table 504 is nested within a cell B3 of outer table 502. The two tables are independently managed and each has its own underlying set of grid object 130, spreadsheet object 106, and table object 104. In this example, cell C3 in outer table 502 is referencing an array of cells B1:B3 in inner table 504, as represented by the summation formula in formula edit box 506. Notice that the reference syntax "Table2!B1" in the formula edit box refers to a separate table and not to cell B3. This is essentially the same cross-table reference edit operation described above, even though the reference is to a table nested within another table cell.

The nested table is another feature that is an improvement over conventional table and spreadsheet approaches. OLE mechanisms of embedding a spreadsheet object within a word processing document do not support nested tables.

Common Document Behaviors

The architecture allows common document behaviors for the text body and across the tables. Such functions as spell checking, grammar checking, find, and replace are continuous across table boundaries, treating the cell contents as if they were part of the document. Moreover, text formatting carries across boundaries. Essentially, any features that are added to modify the text are similarly applied across a table boundary to text inside a table. The conventional OLE mechanisms of embedding a spreadsheet object within a word processing document were incapable of supporting these common document behaviors that traversed table boundaries.

Functionality Features

This section describes how the architecture functionally supports the user interface features described above, including recalculation, reference edit mechanics, cross-table referencing, the formula edit box, and structure changes to the table. These functionality features are described separately below.

Data v. Presentation

The integrated table/spreadsheet architecture 100/400 separates data functions from presentation functions of the integrated table/spreadsheet by employing dual objects per table or floating field. As shown in FIG. 4, there is one pair of spreadsheet and grid objects for each table or floating field. The grid object 130 maintains the data and format information, and facilitates the recalculation process. The corresponding spreadsheet objects 106 are more concerned with presenting the table and free floating field as part of the document, as well as capturing user inputs into the table and free floating field.

The separation is beneficial because it allows the architecture to support cross-table referencing, reference editing to other tables, and universal recalculation throughout the document. The underlying grid objects do not care how the tables are laid out or where they appear in the document, nor do they care if there are one or multiple grid objects. Similarly, the spreadsheet objects 106 do not worry about the data and formulas, or the recalculation process.

Recalculation

Recalculation is a function performed by the architecture 100 in response to modification of a table or free floating field. When a modification is made, the architecture 100 recalculates the various formulas in all tables and free floating fields in the document that may have been affected by user input.

Continuing the example of FIG. 6, when the user changes the value in cell B2 of first table 602 from $300 to $400, the recalculation engine 142 in spreadsheet engine 112 recalculates the formulas in cell B6 of first table 602 to update the amount from $3,060 to $3,160. The recalculation engine 142 also re-computes the formula in cell B2 of third table 606 to yield $2,400 and the formula in cell B4 in third table 606 to yield $7,900. Finally, the recalculation engine 142 recalculates the formula in free floating field 608 to update the value from $12,060 to $12,160. This recalculation occurs automatically across the entire document in response to the user input.

Figure 9:
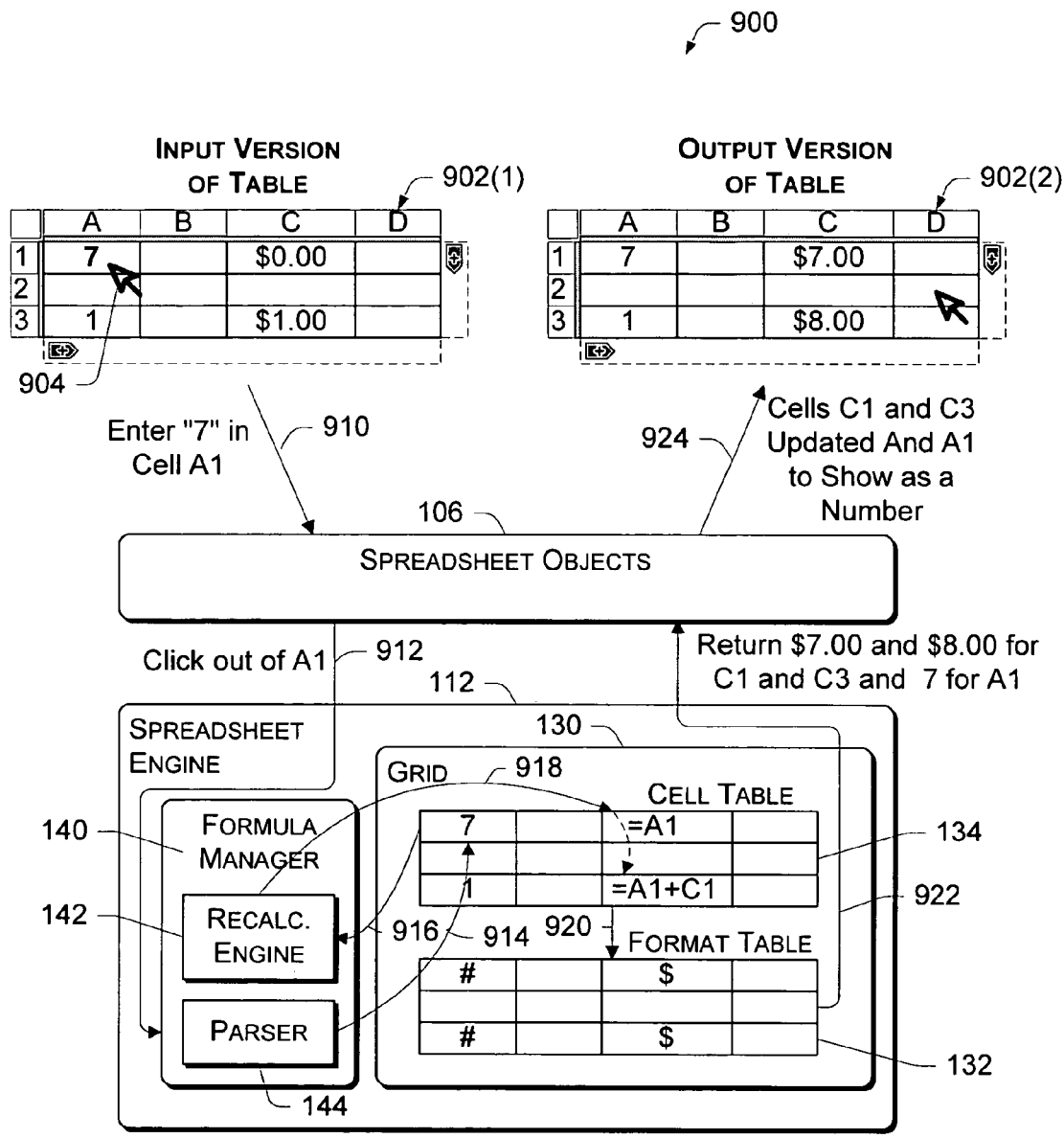
FIG. 9 is a diagrammatic illustration of how a user interface table in a rendered document and underlying functional components in the architecture work together during a recalculation operation.

FIG. 9 illustrates the recalculation process 900 for a single table in more detail. An input version of the user interface table 902(1) is shown at a time when the user enters a new value "7" in cell A1, but has not yet confirmed the entry (e.g., by hitting the "Enter" key or clicking out of the cell). An output version of the UI table 902(2) is shown at a time just after user confirmation.

A corresponding pair of spreadsheet and grid objects 106 and 130 exists for the table 902. The grid object 130 maintains a cell table 134 and a 11 format table 132. Prior to user entry of "7" into cell A1, cell table 134 contains a value "1" in cell A3, a formula referencing cell A1 (i.e., "=A1") in cell C1, and a formula summing cells A1 and C1 (i.e., "=A1+C1") in cell C3. The format table 132 indicates that cell A3 is formatted as a number, and that cells C1 and C3 are formatted as currency in U.S. dollars. The input version of UI table 902(1) shows results of the formatted formulas as $0.00 in cell C1 and $1.00 in cell C3.

Now, suppose the user enters the value "7" into cell A1 of UI table 902(1), as indicated by the pointer 904. The value is received at the spreadsheet objects 106, as indicated by flow arrow 910. Once the user confirms this entry by moving the selection out of the cell A1, the newly entered value "7" is passed to the spreadsheet engine 112 and particularly, the parser 144 of formula manager 140 (flow arrow 912).

The parser 144 parses the entry and determines it to be a data value. The parser 144 puts the data value into cell A1 of the cell table 134 (flow arrow 914). This insertion causes a table change event, which is sent to the recalculation engine 142 to initiate a recalculation (flow arrow 916). The recalculation engine 142 runs through the formula chain to recalculate any formula anywhere that is affected by the new data value in cell A1. In this case, the formulas in cells C1 and C3 are affected and hence, these formulas are recalculated (flow arrow 918). The recalculation produces a result of "7" in cell C1 and a result of "8" in cell C3.

Afterwards, the format table 132 is consulted to determine the desired format for the new value and recalculated formulas (flow arrow 920). Here, the formula results are formatted as currency as indicated by the "$" symbols in cells C1 and C3, and the new value "7" is formatted as a number as indicated by the "#" symbol in cell A1.

The spreadsheet engine returns the formatted results $7.00 and $8.00 to the spreadsheet objects 106 (flow arrow 922). The spreadsheet objects 106 updates the table with these formatted results to produce the output version of the UI table 902(2) (flow arrow 924).

The recalculation event is essentially instantaneous. The user merely sees an immediate change in the UI table from input version 902(1) to output version 902(2).

Reference Edit Mechanics

The reference edit mechanism allows the user to reference another cell to obtain data, rather than forcing the user to type in a value or the reference syntax. In FIG. 9, consider the situation when the user created the formula "=A1" in cell C1. The user selects cell C1, types in an "=" sign to indicate a formula, and then references the cell A1 by moving the mouse pointer 904 to cell A1 and clicking. The spreadsheet objects 106 (namely, CellEditing object 152) capture this reference and pass it to parser 144. The parser 144 recognizes it as a formula, creates a formula object and inserts the formula into a cell of cell table 134, as indicated by cell C1.

Cross-Table Referencing and Universal Recalculation

With architecture 100, reference editing may be extended across multiple tables and free floating fields distributed throughout a document. A cell in one table or a free floating field may reference a cell in another table, a different free floating field, or a combination of a table cell and free floating field. The architecture 100 automatically recalculates all tables and free floating fields that are affected by a change in any one table cell or free floating field.

Figure 10:
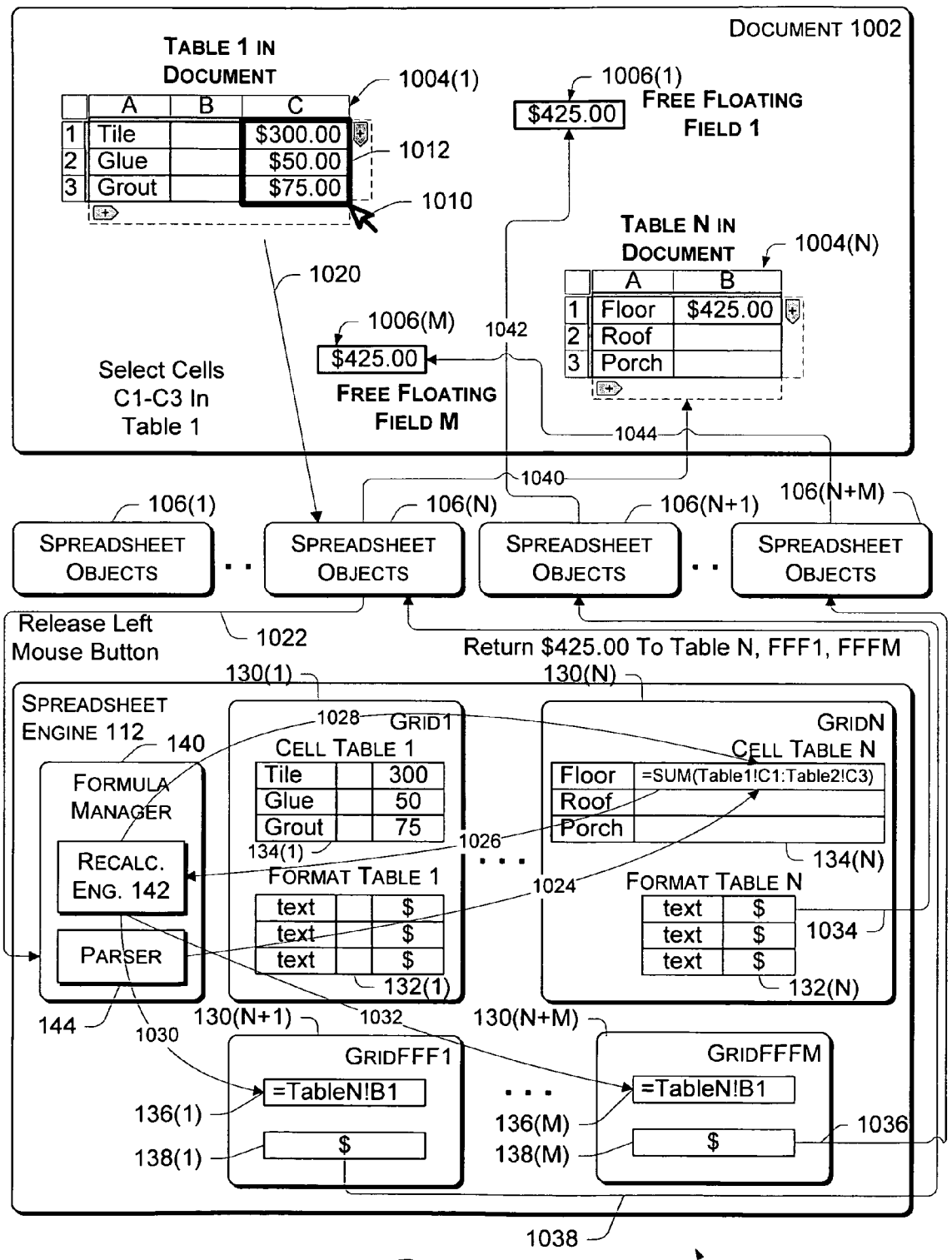
FIG. 10 is a diagrammatic illustration of how multiple UI tables and underlying functional components in the architecture work together during a cross-table reference edit operation.

FIG. 10 illustrates the recalculation process 1000 for a document 1002 containing multiple tables 1004(1), . . . , 1004(N) and multiple free floating fields 1006(1), . . . , 1006(M) distributed throughout the text body. A corresponding pair of spreadsheet and grid objects 106 and 130 is created for each table 1004(1)-1004(N) and each free floating field 1006(1)-1006(M) in the document 1002.

In this illustration, spreadsheet object 106(1) and associated grid object 130(1) support UI table 1004(1), spreadsheet object 106(N) and associated grid object 130(N) support UI table 1004(N), spreadsheet object 106(N+1) and associated grid object 130(N+1) support free floating field 1006(1), and spreadsheet object 106(N+M) and associated grid object 130(N+M) support free floating field 1006(M). The table grid objects 130(1)-130(N) each contain a cell table 134(1)-134(N) and a format table 132(1)-132(N). The FFF grid objects 130(N+1)-130(N+M) each contain a single cell 136(1)-136(M) and a corresponding format cell 138(1)-138(M).

Suppose the user is entering a summation formula in cell B1 of UI table 1004(N) that adds three cells C1-C3 in table 1004(1). Rather than typing in the reference syntax (i.e., "=SUM(Table1!C1:Table1!C3)"), the user may simply move the pointer 1010 to table 1004(1) and select the desired array of cells, as indicated by the selection block 1012. The spreadsheet object 106(N) (namely, the CellEditing object) associated with the source table 1004(N) recognizes the reference edit operation and captures the selected cells C1-C3 in remote referenced table 1 (flow arrow 1020). When the user confirms this entry by moving the selection out of the referenced table 1004(1), the newly entered formula "=SUM(Table1!C1:Table1!C3)" is passed to the spreadsheet engine 112 and particularly, the parser 144 of formula manager 140 (flow arrow 1022).

The parser 144 determines that the entry is a formula and creates a formula object (not shown) and adds the formula to the formula chain. The parser 144 puts the formula into cell B1 of the cell table 134(N) in cell table N (flow arrow 1024). This insertion generates a table change event, which is sent to the recalculation engine 142 to initiate a recalculation (flow arrow 1026).

The recalculation engine 142 runs through the entire formula chain to recalculate any formula in any table or free floating field that is affected by adding the new formula in cell B1. In this case, the formulas in free floating cells 136(1) and 136(M) are affected. But, since these formulas rely on the result of the newly entered formula in table N, they are moved to the end of the formula chain. Thus, the new formula is first calculated (flow arrow 1028), and then the formulas in free floating field cells 136(1) and 136(M) are recalculated (flow arrows 1030 and 1032). The recalculation produces a result of "425" for table cell B1 in cell table N, a result of "425" in FFF cell 136(1), and a result of "425" in FFF cell 136(M).

Afterwards, the various format tables 132(N) and format cells 138(1) and 138(M) are consulted to determine the desired format for the results of the recalculated formulas. Here, all formula results are formatted as currency as indicated by the "$". The spreadsheet engine 112 returns the formatted results "$425.00" to the associated spreadsheet objects 106(N), 106(N+1), and 106(N+M) (flow arrows 1034, 1036, 1038). The spreadsheet objects then update their associated table and free floating fields with these formatted results to produce the 11 output as shown in FIG. 10 (flow arrows 1040, 1042, 1044).

Once again, the recalculation event is essentially instantaneous and the user merely perceives an immediate change in the affected UI table and free floating fields throughout the document 1002.

Formula Edit Box

The CellEditing object 152 manages the formula edit box that permits user edits of formulas. The formula edit box is provided in the user interface in response to the user entering the "=" symbol at the beginning of a cell. The formula edit box is overlaid as a separate entry field above the cell into which the user is inserting a formula. The CellEditing object 152 captures the user entry of various variants in the formula, and facilitates reference editing to other cells as a way to input variants. When the formula is entered via the formula edit box and confirmed, the CellEditing object 152 passes the formula to the formula manager 140 in the spreadsheet engine 112 for parsing. The formula edit box is then removed from the user interface.

Structural Changes

The Table object 104 manages and monitors the user input for structure changes, such as insertion/deletion of a row, merging cells, and so forth. When the user makes a structure change, the Table object 104 fires events to the GridBehavior object 150, which informs the spreadsheet engine 112, and in turn updates the cell table 134 associated with the UI table.

As above, any change to the cell table causes an event that is returned to the recalculation engine 142 to initiate a recalculation cycle. The recalculation engine steps through the chain of formulas and updates all cells affected by the structural change, returning any errors that might arise from the structure change (e.g., loss of a reference value as a result of deleting a row/column). The spreadsheet engine then outputs the results of the recalculation and the UI table is updated to reflect the structural change and the recalculation results.

Cut, Copy, Paste

A separate document object may be employed to manage operations affecting the entire document, rather than a specific table. The document object plays a role in initially inserting the table/spreadsheet into the document. The document object may be constructed similarly to the GridBehavior object 150 and configured to monitor for cut, copy, and paste operations. When a cut or copy operation is performed, the object places the HTML code on the clipboard. Upon a subsequent paste operation, the HTML code is retrieved from the clipboard and inserted into the appropriate location. It is noted that, unlike some spreadsheet programs, the user is not forced to cut/copy and then immediately paste.

One unique problem that is not encountered by traditional spreadsheet programs is the ability to create a new table through a paste operation. When a new table is created, the architecture automatically renames the new table and adjusts all references within the table that were pasted.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An architecture embodied on one or more computer-readable storage media, the architecture comprising:
   a user interface to present a document containing text and a table, wherein the table supports full spreadsheet functionality; and
   a table management system to manage how the table appears in the document and to manage spreadsheet functions for the table including automatic recalculation,
   wherein the bifurcated architecture provides document behavior operations, including one or more of spell checking, grammar checking, find, replace, and text formatting, across table boundaries, such that when invoked, document behavior operations that are applied to the text outside of the table are applied across a table boundary to text inside the table.

2. The architecture of claim 1, wherein the table management system provides a formula edit box to permit the user to enter a formula into a cell of the table.

3. The architecture of claim 1, wherein the table management system comprises:
   a table component to support editing functionality of the table; and
   a spreadsheet component to receive data and formulas input into the table.

4. The architecture of claim 1, wherein the table management system comprises:
   a cell table to maintain data values and formulas used in the table; and
   a format table to maintain formatting information used in the table.

5. The architecture of claim 1, wherein the table management system comprises:
   a cell table to maintain data values and formulas used in the table; and
   a recalculation engine to recalculate the formulas following a change to a data value or formula in the cell table.

6. The architecture of claim 1, wherein the table management system comprises:
   a cell table to maintain data values and formulas used in the table;
   a delay parser to parse input for the cell table as needed; and
   a recalculation engine to recalculate the formulas following a change to a data value or formula in the cell table.

7. The architecture of claim 1, wherein the document contains multiple tables, and the table management system is configured to maintain data and formulas for the multiple tables.

8. The architecture of claim 1, wherein the user interface presents multiple tables in one or more documents, and the table management system is configured to maintain data and formulas for the multiple tables and track references made from one table to another table, the table management system being further configured to update any data and formulas in the multiple tables that is affected by a change made to one of the tables.

9. A method comprising:
   presenting a table user interface (UI) within a markup language document including text and a table, the table UI containing data and at least one formula referencing the data, wherein the table supports full spreadsheet functionality;
   creating a cell table to hold the data and formula for the table UI;
   creating a format table to hold formatting information for the table UI;
   receiving user input in the table UI;
   parsing the user input to update the cell table and the format table;
   in an event the user input changes the data being referenced, automatically recalculating the formula in the cell table to produce a new result;
   presenting the table UI with the new result; and
   providing a document behavior operation including one or more of spell checking, grammar checking, find, replace, and text formatting, across table boundaries, such that when invoked, document behavior operations that are applied to the text outside of the table are applied across a table boundary to text inside the table.

10. The method of claim 9, wherein the presenting comprises rendering the table UI as an HTML table.

11. The method of claim 9, wherein the cell table references one or more cell objects, each cell object being associated with a cell in the table UI.

12. The method of claim 9, wherein the format table contains formatting information for individual cells in the table UI.

13. The method of claim 9, wherein the parsing determines whether the user input is a formula, data, or text-based, and determines the data format of that input.

14. The method of claim 9, wherein the recalculating comprises traversing a chain of formulas and calculating the formulas according to an order in the chain.

15. The method of claim 9, wherein parsing comprises delaying parsing of selected cells in the cell table and the recalculating comprises inducing additional parsing of the selected cells as needed by the formula.

16. The method of claim 9, further comprising presenting a free floating field in the document and separate from the table, the free floating field containing a formula that references the data in the table.

17. The method of claim 16, wherein the recalculating further comprises recalculating the formula in the free floating field in response to change of the data.

18. A computer readable medium having computer-executable instructions that, when executed on one or more processors, perform the method as recited in claim 9.

19. A computer readable medium having computer-executable instructions that, when executed on one or more processors, performs the following:
 construct a table user interface (UI) for display within a document including text and a table, wherein the table supports the full spreadsheet functionality;
 create a cell table to hold data and at least one formula for the table UI;
 upon modification of the data, automatically recalculate the formula in the cell table to produce a new result; and
 provide a document behavior operation including one or more of spell checking, grammar checking, find, replace, and text formatting, across table boundaries, such that when invoked, document behavior operations that are applied to the text outside of the table are applied across a table boundary to text inside the table.

20. The computer medium of claim 19, further comprising computer-executable instructions that, when executed on one or more processors, perform creation of a format table to hold information pertaining to a data format of the table UI.

21. A computer readable medium having computer-executable instructions that, when executed on one or more processors, performs the following:
 construct a first table user interface (UI) for display within a document including text and table, wherein the table supports full spreadsheet functionality;
 create a first cell table to hold data for the first table UI;
 construct a second table user interface (UI) for display within the document;
 create a second cell table to hold a formula for the second table UI, the formula referencing the data in the first cell table;
 upon modification of the data in the first cell table, automatically recalculate the formula in the second cell table to produce a new result; and
 providing a document behavior operation including one or more of spell checking, grammar checking, find, replace, and text formatting, across table boundaries, such that when invoked, document behavior operations that are applied to the text outside of the table are applied across a table boundary to text inside the table.

22. The computer medium of claim 21, wherein the first table UI is nested within the second table UI.

23. A computer readable medium having computer-executable instructions that, when executed on one or more processors, performs the following:
 construct a table user interface (UI) for display within a document containing text and a table, wherein the table supports full spreadsheet functionality;
 create a first cell table to hold data for the table UI;
 construct a free floating field for display within the document;
 create a second cell table to hold a formula for the free floating field, the formula referencing the data in the first cell table;
 upon modification of the data in the first cell table, automatically recalculate the formula in the second cell table to produce a new result; and
 provide a document behavior operation including one or more of spell checking, grammar checking, find, replace, and text formatting, across table boundaries, such that when invoked, document behavior operations that are applied to the text outside of the table are applied across a table boundary to text inside the table.

24. An architecture comprising:
 a user interface to present a document containing text and a table, wherein the table supports full spreadsheet functionality; and
 a table management system to manage how the table appears in the document and to manage spreadsheet functions for the table, the table management system comprising:
  a cell table to maintain data values and formulas used in the table;
  a delay parser to parse input for the cell table as needed; and
  a recalculation engine to automatically recalculate the formulas following a change to a data value or formula in the cell table,
 wherein the bifurcated architecture provides document behavior operations, including one or more of spell checking, grammar checking, find, replace, and text formatting, across table boundaries, such that when invoked, document behavior operations that are applied to the text outside of the table are applied across a table boundary to text inside the table.

* * * * *